(12) United States Patent
Wengreen

(10) Patent No.: US 11,807,406 B1
(45) Date of Patent: Nov. 7, 2023

(54) DRONES THAT SAVE PEOPLE TRAPPED IN AVALANCHES

(71) Applicant: Owen Charles Wengreen, Sammamish, WA (US)

(72) Inventor: Owen Charles Wengreen, Sammamish, WA (US)

( * ) Notice: Subject to any disclaimer, the term of this patent is extended or adjusted under 35 U.S.C. 154(b) by 0 days.

(21) Appl. No.: 18/219,688

(22) Filed: Jul. 9, 2023

Related U.S. Application Data

(63) Continuation-in-part of application No. 18/217,586, filed on Jul. 2, 2023.

(51) Int. Cl.
| | |
|---|---|
| *B64U 10/14* | (2023.01) |
| *A63B 29/02* | (2006.01) |
| *G06T 7/70* | (2017.01) |
| *G06V 20/17* | (2022.01) |
| *G06V 40/10* | (2022.01) |
| *H04W 4/029* | (2018.01) |
| *H04W 4/90* | (2018.01) |
| *H04W 4/40* | (2018.01) |
| *B64U 101/30* | (2023.01) |
| *B64U 101/55* | (2023.01) |

(52) U.S. Cl.
CPC ............ *B64U 10/14* (2023.01); *A63B 29/021* (2013.01); *G06T 7/70* (2017.01); *G06V 20/17* (2022.01); *G06V 40/10* (2022.01); *H04W 4/029* (2018.02); *H04W 4/90* (2018.02); *A63B 2029/022* (2013.01); *B64U 2101/30* (2023.01); *B64U 2101/55* (2023.01); *G06T 2207/10032* (2013.01); *G06T 2207/30204* (2013.01); *H04W 4/40* (2018.02)

(58) Field of Classification Search
CPC .......................... B64U 10/14; B64U 2101/55; B64U 2101/30; G06T 7/70; G06T 2207/10032; G06T 2207/30204; A63B 2029/022; A63B 29/021; G06V 40/10; G06V 20/17; H04W 4/029
See application file for complete search history.

(56) References Cited

U.S. PATENT DOCUMENTS

| | | | |
|---|---|---|---|
| 7,346,336 | B2 | 3/2008 | Kampel |
| 8,214,088 | B2 | 7/2012 | Lefebure |
| 8,723,719 | B1 | 5/2014 | Piesinger |
| 10,759,532 | B2 | 9/2020 | Zhang |
| 10,802,794 | B2 | 10/2020 | Kotlaba |
| 10,836,508 | B2 | 11/2020 | Overall |
| 11,536,803 | B2 | 12/2022 | Gaalema |
| 2023/0168332 | A1* | 6/2023 | Cellerier ............... B64C 39/024 340/539.13 |

* cited by examiner

*Primary Examiner* — Benjamin P Lee

(57) ABSTRACT

Avalanches often trap people under the snow. Although nearly all avalanche victims survive the initial avalanche, asphyxiation will occur after about fifteen minutes if rescuers do not know where to dig to uncover avalanche victims. Drones can include unique hardware and software that enables them to search for avalanche victims and mark the locations of avalanche victims to quickly and accurately notify rescuers where to dig through the snow to save avalanche victims from asphyxiation.

17 Claims, 13 Drawing Sheets

DRONES THAT SAVE PEOPLE TRAPPED IN AVALANCHES

CROSS-REFERENCE TO RELATED APPLICATION

The entire contents of the following application are incorporated by reference herein: U.S. patent application Ser. No. 18/217,586; filed Jul. 2, 2023; and entitled DRONES THAT SAVE PEOPLE FROM AVALANCHES.

BACKGROUND

Field

Various embodiments disclosed herein relate to drones. Certain embodiments relate to drones that save people from avalanches.

Description of Related Art

People often search for avalanche victims by digging through the snow with their hands or sometimes a shovel. Avalanche fields are often very large. As a result, digging through heavy, compact avalanche snow without knowing where to dig is unlikely to uncover avalanche victims before they pass away due to asphyxiation.

Sometimes, people push thin, metal rods called probes through the snow to feel if they contact a person under the snow. This probe method is typically far too slow to save many avalanche victims.

Some people have handheld avalanche transceivers that can be used to search for avalanche victims that also have handheld avalanche transceivers. Few people own handheld avalanche transceivers due to their high cost and difficulty to use. Effectively using avalanche transceivers requires both training and the ability to perform under the immense pressure of trying to save avalanche victims before asphyxiation. Unfortunately, the fact that few people own handheld avalanche transceivers and few people know how to use them effectively results in many preventable deaths due to avalanches.

Thus, there is a need for systems and methods that can quickly and accurately identify the locations of people buried in avalanches.

SUMMARY

Only 5.4 percent of avalanche deaths are caused solely by trauma from the initial avalanche; the primary danger is the risk of asphyxiation under the snow after the avalanche.

93 percent of avalanche victims survive if they are dug out within 15 minutes. If not uncovered within 15 minutes, few avalanche victims survive. After 45 minutes, only 20 to 30 percent of avalanche victims will live if uncovered. After two hours, the odds of survival are nearly zero. Thus, the key to saving avalanche victims is to detect their location quickly so they can be dug out in less than 15 minutes.

Unfortunately, most avalanche encounters involve people blindly searching an enormous area that is typically around 150 meters in length and 50 to 80 meters wide, which results in an avalanche field that is around 9,750 square meters. Digging through deep, heavy, compacted avalanche snow (often with nothing more than hands) is arduous and time consuming. If three people are searching and each person can dig down through two square meters to the necessary search depth each minute, then less than 1% of the avalanche field can be searched within the critical 15 minutes before asphyxiation is likely.

Considering only around 1% of an avalanche field can typically be searched before it is too late to save the avalanche victims, the ability to quickly and accurately identify where to search for avalanche victims will save many lives.

In some embodiments, a method of using a drone system comprises a first drone configured to fly. The first drone can comprise a first camera system. Methods can comprise flying the first drone above an avalanche zone and identifying an avalanche victim search area.

Some embodiments comprise receiving, by the drone system, a first Global Positioning System ("GPS") location of a remote computing device of an avalanche reporter, and flying, autonomously by the drone system, the first drone to a second location that is within 100 meters of the first GPS location in response to receiving the first GPS location.

In some embodiments, identifying the avalanche victim search area comprises taking at least one picture at the second location, by the first camera system of the first drone, of a snow ground layer, analyzing, by the drone system, the at least one picture to evaluate a first surface roughness of the snow ground layer, and identifying, by the drone system, the avalanche victim search area at least partially based on the first surface roughness.

Some embodiments comprise searching, autonomously by the first drone, for an avalanche victim in the avalanche victim search area.

In some embodiments, identifying the avalanche victim search area comprises taking at least one picture, by the first camera system of the first drone, of a snow ground layer, analyzing, by the drone system, the at least one picture to evaluate a first surface roughness of the snow ground layer in a first area and in a second surface roughness in a second area, and determining, by the drone system, that avalanche victim search area comprises the first area at least partially based on determining the first surface roughness of the first area is at least one of indicative of an avalanche, greater than a predetermined threshold, and greater than the second surface roughness of the second area.

Some embodiments comprise searching, by at least one drone, for an avalanche victim in the avalanche victim search area in response to identifying the avalanche victim search area.

Some embodiments comprise creating a geofence around the avalanche victim search area and searching, autonomously by the first drone, for the avalanche victim within the geofence.

In some embodiments, drone system comprises artificial intelligence, and identifying the avalanche victim search area comprises taking at least one picture, by the first camera system of the first drone, of a snow ground layer, and analyzing, by the artificial intelligence of the drone system, the at least one picture to determine at least one area shown within the at least one picture that has surface features indicative of an avalanche. Embodiments can comprise searching, autonomously by the first drone, for an avalanche victim in the avalanche victim search area.

In some embodiments, methods use a drone system that comprises a first drone configured to fly and several more drones configured to fly. Drones can work together to detect avalanche victims. Each drone can take pictures that are sent to and analyzed by the drone system. Each drone can detect electronic devices using electronic device detection systems.

Data from each drone regarding electronic device detection can be sent to the drone system for analysis.

In some embodiments, a first drone includes a camera system with one or more cameras and equipment necessary to operate the cameras including memory and software. Some embodiments comprise flying the first drone above an avalanche zone and identifying an avalanche victim search area.

In some embodiments, a first drone comprises an electronic device detection system. Embodiments can comprise searching, by the first drone, for an avalanche victim in the avalanche victim search area.

Some embodiments comprise determining an estimated location of the avalanche victim by taking at least one picture, by the first camera system, of at least a portion of the avalanche victim search area; detecting, by the drone system, people shown within the at least one picture; detecting, by the electronic device detection system, electronic devices within the avalanche victim search area; determining that one of the electronic devices is not located adjacent to any of the people shown within the at least one picture; and/or detecting a first location of the one of the electronic devices.

Some embodiments comprise determining an estimated location of the avalanche victim by taking at least one picture, by the first camera system, of at least a portion of the avalanche victim search area; detecting, by the drone system, people shown within the at least one picture; detecting, by the electronic device detection system, electronic devices within the avalanche victim search area; determining that one of the electronic devices is not located within 5 meters, within 10 meters, or within 17 meters of any of the people shown within the at least one picture; and/or detecting a first location of the one of the electronic devices.

In some embodiments, an electronic device detection system comprises a cellular communication detector configured to detect a mobile phone. Detecting the electronic devices within the avalanche victim search area can comprise detecting, by the cellular communication detector of the first drone, the mobile phone. The one of the electronic devices can be the mobile phone. Detecting the first location of the one of the electronic devices can comprise detecting the first location of the mobile phone.

In some embodiments, the electronic device detection system comprises a radio receiver configured to detect at least one radio communication. Detecting the electronic devices within the avalanche victim search area can comprise detecting, by the radio receiver of the first drone, the at least one radio communication from the electronic devices. The one of the electronic devices can be a radio communication device, and detecting the first location of the one of the electronic devices can comprise detecting a source of at least one radio transmission from the radio communication device.

In some embodiments, detecting the source of the at least one radio transmission comprises detecting ultra-high frequency radio waves between 2.1 gigahertz and 3.5 gigahertz.

In some embodiments, detecting the source of the at least one radio transmission comprises detecting ultra-high frequency radio waves between 6.2 gigahertz and 7.8 gigahertz.

In some embodiments, detecting the electronic devices within the avalanche victim search area comprises emitting, by the first drone, at least one electromagnetic interrogation pulse, and receiving, by the first drone, a signal from the one of the electronic devices in response to emitting the at least one electromagnetic interrogation pulse.

In some embodiments, detecting, by the electronic device detection system, the electronic devices within the avalanche victim search area comprises autonomously flying, by the drone system, the first drone along a first path that is inwardly offset from a perimeter of the avalanche victim search area and autonomously flying, by the drone system, the first drone along a second path that is inwardly offset from the first path.

In some embodiments, detecting, by the electronic device detection system, the electronic devices within the avalanche victim search area comprises autonomously flying, by the drone system, the first drone along a horizontally undulating path over the avalanche victim search area while detecting, by the electronic device detection system, the electronic devices.

In some embodiments, detecting the first location of the one of the electronic devices comprises detecting, by the first drone while flying along a first path, a first signal strength variation from the one of the electronic devices; determining a second location of a first peak of the first signal strength variation; detecting, by the first drone while flying along a second path, a second signal strength variation from the one of the electronic devices; and determining a third location of a second peak of the second signal strength variation.

Some embodiments comprise detecting, by the first drone while flying along a third path between the second location and the third location, a third signal strength variation from the one of the electronic devices, and determining a fourth location of a third peak of the third signal strength variation, wherein the fourth location is the first location of the one of the electronic devices.

In some embodiments, the first path and the second path intersect. In some embodiments, the second path is perpendicular to the first path. In some embodiments, the first path and the second path intersect at an angle that is greater than 70 degrees and less than 110 degrees.

In some embodiments, the drone system uses one or more drones to drop markers on the location of the avalanche victim and/or around the location of the avalanche victim. People can use the markers to know where to dig through the snow to save the avalanche victim.

Some embodiments comprise dropping, by the first drone, a marker on the first location in response to detecting the first location of the one of the electronic devices.

In some embodiments, the first drone comprises a powder container. Some embodiments comprise dropping, by the first drone from the powder container, a powder at least two locations such that the first location is between the at least two locations.

In some embodiments, a first drone comprises a powder container having an orifice and a wheel configured to impede a powder from exiting the orifice. Some embodiments comprise dropping the powder along a first path by rotating the wheel and dropping the powder along a second path by rotating the wheel. The first path and the second path can intersect. The first path and the second path can cross over the first location. The first path and the second path can form a cross shape or any other shape.

In some embodiments, the first drone comprises a powder container having an orifice and a wheel configured to impede a powder from exiting the orifice. Some embodiments comprise dropping the powder along a first path around the first location by rotating the wheel and dropping the powder along a second path around the first location by rotating the wheel. The second path can be outwardly offset from the first path.

Some embodiments comprise dropping the powder along a third path around the first location by rotating the wheel and dropping the powder along a fourth path around the first location by rotating the wheel. The third path can be outwardly offset from the second path. The fourth path can be outwardly offset from the third path. The paths can be concentric. The paths can be circular. The paths can be curved. Each path can be a loop. Each path can be a closed or partly open curve. In some embodiments, the paths are concentric rings that form a bullseye on the location of the avalanche victim.

In some embodiments, a drone system comprising a first drone configured to fly. The first drone can comprise a first camera system having one or more cameras. Embodiments can comprise flying, by the drone system, the first drone above an avalanche zone and identifying, by the drone system, an avalanche victim search area.

In some embodiments, the first drone comprises an electronic device detection system. Some embodiments comprise searching, by the first drone, for an avalanche victim in the avalanche victim search area.

Some embodiments comprise determining an estimated location of the avalanche victim by taking at least one picture, by the first camera system of the first drone, of at least a portion of the avalanche victim search area; detecting, by the electronic device detection system, an electronic device within a portion of the avalanche victim search area; and determining, by the drone system, that the at least one picture does not show a person with the portion.

Some embodiments comprise automatically dropping, by the first drone or by any of the drones of the drone system, a marker on the estimated location in response to determining the estimated location.

In some embodiments, a drone is configured to help an avalanche victim by identifying an estimated location of the avalanche victim. A drone can comprise at least one propeller configured to enable the drone to fly and a camera system having one or more cameras.

Some embodiments comprise an electronic device detection system, at least one marker configured to be dropped by the drone, and program instructions. Program instructions can be configured to take at least one picture, by the camera system; detect, by the electronic device detection system, an electronic device at a first location; and determine (by the program instructions) that the at least one picture does not show a person at the first location.

Program instructions can be configured to drop the at least one marker to mark the first location in response to the program instructions taking the at least one picture, detecting the electronic device at the first location, and determining that the at least one picture does not show the person at the first location.

In some embodiments, an electronic device detection system comprises a cellular communication detector configured to detect a mobile phone, and the program instructions are configured to detect the electronic device at the first location by detecting, by the cellular communication detector, the mobile phone at the first location.

In some embodiments, an electronic device detection system comprises a radio receiver configured to detect at least one radio communication, and the program instructions are configured to detect the electronic device at the first location by detecting, by the radio receiver, the at least one radio communication at the first location.

In some embodiments, the electronic device detection system comprises an electromagnetic interrogation pulse emitter and an antenna. Program instructions can be configured to detect the electronic device at the first location by emitting, by the electromagnetic interrogation pulse emitter, an electromagnetic interrogation pulse and then, in response, detecting, by the antenna, a signal from the electronic device.

Some embodiments comprise at least one memory having the program instructions and at least one processor configured to execute the program instructions.

In some embodiments, the at least one marker comprises at least one flag. In some embodiments, the at least one marker comprises powder. In some embodiments, the powder is a dye.

In some embodiments, the at least one marker comprises a liquid. In some embodiments, the liquid is paint, which can be biodegradable and safe for the environment. In some embodiments, the liquid is colored with dye to make the liquid easy to see on the snow.

In some embodiments, the drone comprises a housing, a battery located inside the housing, and a container coupled to the housing. At least one propeller can be coupled to the housing. The container can comprise a funnel having an inside area configured to hold a marker.

In some embodiments, the container comprises an exit that is fluidly coupled to the inside area such that the marker can leave the container through the exit to mark a location. The exit can comprise a cylindrical channel and a distal end where the powder leaves the container. The at least one marker can comprise a powder located in the inside area of the funnel. The funnel can be oriented to direct the powder out of the exit via gravity.

In some embodiments, the drone comprises a motor and a spherical wheel having an outer perimeter that comprises a first cavity and a second cavity.

In some embodiments, the motor is coupled to the housing and configured to rotate the spherical wheel. The spherical wheel can be located at least partially in the cylindrical channel such that the spherical wheel is configured to block the powder from passing through the exit while the spherical wheel is not rotating relative to the cylindrical channel.

In some embodiments, program instructions are configured to drop the at least one marker by rotating the spherical wheel by actuating the motor to cause at least a portion of the powder to enter the first cavity when the first cavity is fluidly coupled with the inside area of the funnel and then exit the first cavity when the first cavity is oriented toward the distal end.

In some embodiments, program instructions are configured to drop the at least one marker by rotating the spherical wheel by actuating the motor to cause at least a portion of the powder to enter the second cavity when the second cavity is fluidly coupled with the inside area of the funnel and then exit the second cavity when the second cavity is oriented toward the distal end. The second cavity can be located on an opposite side of the outer perimeter relative to the first cavity.

In some embodiments, program instructions are configured to drop the at least one marker by rotating the spherical wheel by actuating the motor to cause at least a portion of the powder to enter the first cavity when the first cavity is oriented toward the inside area of the funnel and then exit the first cavity when the first cavity is oriented toward the distal end.

In some embodiments, program instructions are configured to drop the at least one marker by rotating the spherical wheel by actuating the motor to cause at least a portion of the powder to enter the first cavity when the first cavity is fluidly coupled with the inside area of the funnel and then exit the first cavity when the first cavity is fluidly coupled with the distal end.

Some embodiments comprise a housing, a battery located inside the housing, and a container coupled to the housing. At least one propeller can be coupled to the housing. The container can comprise an inside area. The container can comprise an exit that is fluidly coupled to the inside area. The exit can comprise a cylindrical channel and a distal end. The at least one marker can comprise a liquid located in the inside area of the container.

In some embodiments, the drone comprises a motor and a spherical wheel having an outer perimeter that comprises a first cavity and a second cavity. The motor can be coupled to the housing. The motor can be coupled to the container. The motor can be configured to rotate the spherical wheel. The spherical wheel can be located at least partially in the cylindrical channel such that the spherical wheel forms a seal with at least a portion of the cylindrical channel.

In some embodiments, program instructions are configured to drop the at least one marker by rotating the spherical wheel by actuating the motor to cause at least a portion of the liquid to enter the first cavity when the first cavity is fluidly coupled with the inside area and then exit the first cavity when the first cavity is oriented toward the distal end.

In some embodiments, program instructions are configured to drop the at least one marker by rotating the spherical wheel by actuating the motor to cause at least a portion of the liquid to enter the first cavity when the first cavity is oriented toward the inside area and then exit the first cavity when the first cavity is oriented toward the distal end.

In some embodiments, program instructions are configured to drop the at least one marker by rotating the spherical wheel by actuating the motor to cause at least a portion of the liquid to enter the first cavity when the first cavity is fluidly coupled with the inside area and then exit the first cavity when the first cavity is fluidly coupled to the distal end.

In some embodiments, a drone comprises a container. The container can be made of light-weight plastic. The container can comprise an inside area. The drone can comprise an exit, and the exit can be fluidly coupled to the inside area (to provide a way out of the inside area). The drone can comprise a wheel that covers at least a portion of the exit, a first motor, and a first shaft having a first axis of rotation. The first shaft can be made of aluminum. The first motor can be coupled to the wheel by the first shaft, and the program instructions can be configured to rotate the wheel by actuating the first motor to drop the at least one marker (out of the exit) to mark the first location.

In some embodiments, at least one marker comprises powder located in the inside area, the exit comprises an orifice, and the wheel comprises an outer perimeter comprising a cavity such that the drone is configured such that the program instructions rotating the wheel cause at least a portion of the powder to enter the cavity when the cavity is fluidly coupled with the inside area and then exit the cavity when the cavity is oriented toward the orifice to mark the first location.

In some embodiments, an exit comprises a cylindrical channel, the wheel is spherical, and the wheel is located at least partially in the cylindrical channel to plug the cylindrical channel to impede the powder (and/or liquid) from exiting the cylindrical channel when the wheel is not rotating.

Some embodiments comprise a second motor coupled to a cover by a second shaft having a second axis of rotation. The cover can be configured to move between a first position where the cover blocks the orifice and a second position where the cover does not block at least a portion of the orifice. Program instructions can be configured to at least partially open the orifice by actuating the second motor to rotate the second shaft (to move the cover from the first position to the second position) to enable the portion of the powder to fall from the drone to mark the first location.

In some embodiments, the first motor and the second motor are coupled to the container, the second axis is perpendicular to the first axis, and the inside area comprises a funnel that directs the powder toward the exit.

In some embodiments, a drone is configured to help an avalanche victim by identifying an estimated location of the avalanche victim. A drone can comprise at least one propeller configured to enable the drone to fly and a camera system having one or more cameras.

In some embodiments, a drone comprises an electronic device detection system, a camera system, at least one marker configured to be dropped by the drone, and program instructions.

In some embodiments, program instructions are configured to determine an estimated location of the avalanche victim by taking at least one picture, by the camera system, of an avalanche victim search area; detecting, by the electronic device detection system, an electronic device within a portion of the avalanche victim search area; and determining, by the program instructions, that the at least one picture does not show a person within the portion of the avalanche victim search area. The program instructions can be configured to drop the at least one marker to mark the estimated location in response to the program instructions determining the estimated location of the avalanche victim.

In some embodiments, a drone comprises a lidar system. Program instructions can be configured to identify the avalanche victim search area by analyzing, using the lidar system, a surface roughness of a snow ground layer and determining that the surface roughness is at least one of indicative of an avalanche and greater than a predetermined threshold.

In some embodiments, a drone comprises a radar system. Program instructions can be configured to identify the avalanche victim search area by analyzing, using the radar system, a surface roughness of a snow ground layer and determining that the surface roughness is at least one of indicative of an avalanche and greater than a predetermined threshold.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
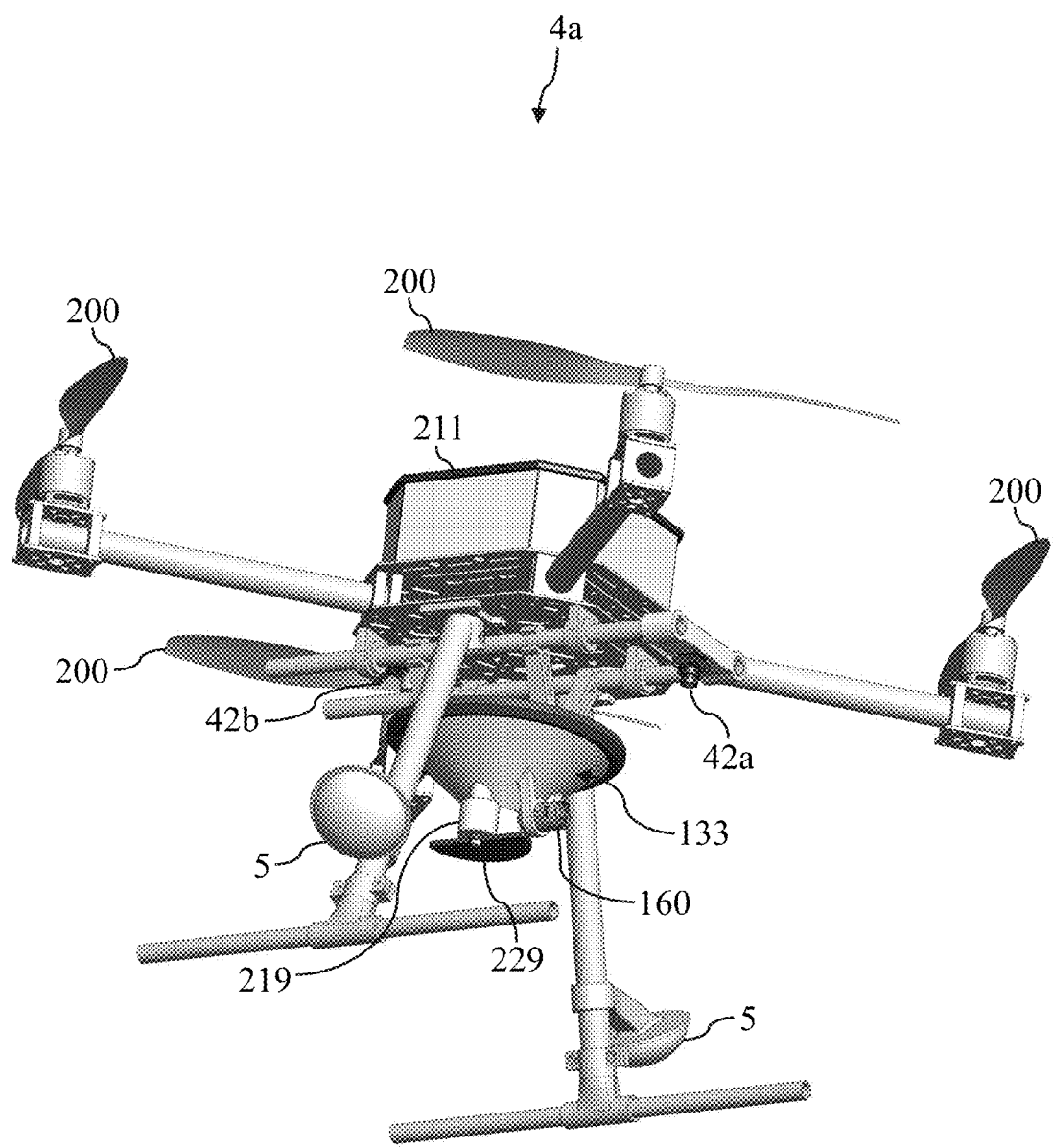
FIG. 1 illustrates a perspective view of a drone, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. About 94.6 percent of avalanche victims (people caught in avalanches) survive the actual avalanche but are at risk of asphyxiation under the snow if they are not dug out quickly. 93 percent of avalanche victims survive if they are dug out within 15 minutes. If not uncovered within 15 minutes, few avalanche victims survive. After 45 minutes, only 20 to 30 percent of avalanche victims will live if uncovered. After two hours, the odds of survival are nearly zero. Thus, the key to saving avalanche victims is to detect their location quickly so they can be dug out in less than 15 minutes.

A drone system 2 can be used to quickly and accurately identify the locations of avalanche victims 57 so rescuers can dig the avalanche victims 57 out of the snow before fatal asphyxiation. Drones 4a, 4b used by the drone system 2 can be stationed remotely relative to the avalanche zone 50. For example, in some cases, the drones 4a, 4b are located at a ski resort's lodge where power is available to keep the drones 4a, 4b charged and a shelter can prevent falling snow from accumulating on the drones 4a, 4b. The shelter can include a roof and an opening (such as an open window or open door) for the drones 4a, 4b to fly out of the shelter when needed. The shelter can be heated to melt any snow that has accumulated on the drones 4a, 4b during their last mission.

The drones 4a, 4b can work together and can share data 45 with the rest of the drone system 2. Multiple drones 4a, 4b working together can reduce the average time needed to locate avalanche victims 57. Using multiple drones 4a, 4b is particularly helpful when the avalanche zone 50 is large. (The avalanche zone 50 is where the avalanche occurred.)

Due to the need to find avalanche victims 57 quickly, drone flying speed is important. In some cases, drones 4a, 4b are stationed in shelters at multiple locations around a ski resort or other avalanche-prone area to minimize the distance from at least one of the drones 4a, 4b to an avalanche zone 50.

A drone system 2 can have elements located at many different locations. In some embodiments, a drone system 2 can use cloud computing elements in addition to locally positioned elements. Drones 4a, 4b can be located near a ski resort or near another avalanche-prone area while other elements of the drone system 2 can be located very far away from the ski resort or other avalanche-prone area. In some embodiments, some elements of the drone system 2 use cloud-based computing where software and servers (and other elements) are located far away from the drones 4a, 4b.

The drone system 2 can include computer systems 14, communication systems 16 (that communicate over any suitable means such as cellular, Internet, wireless, wired, radio, Bluetooth, etc.), software 18, memory 20, image analysis systems 22, artificial intelligence systems 24, global position systems 26 (coupled to drones 42a, 42b and/or located remotely relative to drones 42a, 42b), map information 28, drone control systems 30, antennas 32, receivers 34, transmitters 36, and all other elements that are useful for any of the embodiments described herein.

Artificial intelligence systems 24 can be predictive, generative, machine learning, deep learning, artificial neural network, natural language processing, narrow, general, super, reactive machine, limited theory, theory of mind, self-aware, and/or any other type of artificial intelligence.

In some embodiments, a method of using a drone system 2 comprises a first drone 4a configured to fly. The first drone 4a can include propellers. The first drone 4a can comprise a first camera system 41, which includes at least one camera 42a. Methods can comprise flying the first drone 4a above an avalanche zone 50, and identifying, by the drone system 2, an avalanche victim search area 52.

Avalanche zones 50 typically occur in the mountains 51 on hills that are steeper than 30 degrees. Methods can comprise flying, by the drone system 2, the first drone 4a above an avalanche zone 50. Methods can comprise autonomously flying the first drone 4a above an avalanche zone 50. Methods can comprise flying, via human radio control and/or via human remote control, the first drone 4a above an avalanche zone 50.

To avoid unnecessary redundancy, many of the embodiments are described with one drone 4a, but all embodiments can include one drone, two drones, 50 drones, and/or any number of drones. A second drone 4b can include any of the features described in the context of a first drone 4a. Additional drones can include any of the features described in the context of the first drone 4a.

A camera system 41 can include any number of cameras 42a, 42b. In some embodiments, a camera system 41 includes a first camera 42a and a second camera 42b. The first camera 42a can be oriented downward. The second camera 42b can be oriented at a 45-degree angle. In some embodiments, the second camera 42b is oriented forward (to provide a real-time flying view).

Most avalanches that trap an avalanche victim 57 under the snow are triggered by either the avalanche victim 57 or by someone in the avalanche victim's party. Often, the avalanche reporter 55 (the person who reports the avalanche 59 to summon help such as ski patrol, ambulance services, or other first responders) is someone in the avalanche victim's party but also can be another person who witnesses the avalanche 59. The avalanche reporter 55 can use her remote computing device 56 (such as a cellphone and/or satellite phone) to contact emergency help and to share a first GPS location 38 of the remote computing device 56. This emergency help can record the first GPS location 38 of the remote computing device 56 and can then share this first GPS location 38 with the drone system 2.

The drone system 2 can send drones 4a, 4b to the first GPS location 38. The avalanche reporter 55 and more specifically the remote computing device 56 may be inside or outside of the avalanche zone 50 when sharing the first GPS location 38. As a result, the drone system 2 uses drones 4a, 4b to explore an area 61 around the first GPS location 38 to identify the avalanche victim search area 52. The area 61 can comprise the avalanche zone 50 and can comprise locations outside of the avalanche zone 50. Thus, there is a need for methods to determine which locations are inside the avalanche victim search area 52 and which locations are outside the avalanche victim search area 52.

Some embodiments comprise receiving, by the drone system 2, a first GPS (Global Positioning System) location 38 of a remote computing device 56 of an avalanche reporter 55, and flying, autonomously by the drone system 2, the first drone 4a to a second location 43 that is within 100 meters of the first GPS location 38 in response to receiving the first GPS location 38.

In some embodiments, identifying the avalanche victim search area 52 comprises taking at least one picture 40 at the second location 43, by the first camera system 41 of the first drone 4a, of a snow ground layer 62, analyzing, by the drone system 2, the at least one picture 40 to evaluate a first surface roughness 67 of the snow ground layer 62, and identifying, by the drone system 2, the avalanche victim search area 52 at least partially based on the first surface roughness 67.

Some embodiments comprise searching, autonomously by the first drone 4a, for an avalanche victim 57 in the avalanche victim search area 52.

Snow that has fallen on the ground creates the snow ground layer 62. Surface roughness is created by inequalities, ridges, and projections on the surface of the snow ground layer 62.

In some embodiments, identifying the avalanche victim search area 52 comprises taking at least one picture 40, by the first camera system 41 of the first drone 4a, of a snow ground layer 62, analyzing, by the drone system 2, the at least one picture 40 to evaluate a first surface roughness 67 of the snow ground layer 62 in a first area 71 and in a second surface roughness 68 in a second area 72, and determining, by the drone system 2, that avalanche victim search area 52 comprises the first area 71 at least partially based on determining the first surface roughness 67 of the first area 71 is at least one of indicative of an avalanche 59, greater than a predetermined threshold 44, and greater than the second surface roughness 68 of the second area 72.

The predetermined threshold 44 can be the minimum amount of inequalities, ridges, and projections on the surface of the snow ground layer 62 that is indicative of an avalanche having occurred.

The second area 72 can be an area in which an avalanche has not occurred. The first area 71 can be an area in which an avalanche has occurred.

Some embodiments comprise searching, by the first drone 4a, for an avalanche victim 57 in the avalanche victim search area 52 in response to identifying the avalanche victim search area 52.

Some embodiments comprise creating a geofence 73 around the avalanche victim search area 52 and searching, autonomously by the first drone 4a, for the avalanche victim 57 within the geofence 73.

In some embodiments, drone system 2 comprises artificial intelligence 24, and identifying the avalanche victim search area 52 comprises taking at least one picture 40, by the first camera system 41 of the first drone 4a, of a snow ground layer 62, and analyzing, by the artificial intelligence 24 of the drone system 2, the at least one picture 40 to determine at least one area 71 shown within the at least one picture 40 that has surface features 74 indicative of an avalanche 59. Embodiments can comprise searching, autonomously by the first drone 4a, for an avalanche victim 57 in the avalanche victim search area 52. Surface features 74 indicative of an avalanche 59 can include inequalities, ridges, cracks, and projections on the surface of the snow ground layer 62.

In some embodiments, methods use a drone system 2 that comprises a first drone 4a configured to fly and several more drones 4b configured to fly. Drones 4a, 4b can work together to detect avalanche victims 57. Each drone 4a, 4b can take pictures that are sent to and analyzed by the drone system 2. Each drone 4a, 4b can detect electronic devices 82a, 82b, 82d using electronic device detection systems 5. Data 45 from each drone 4a, 4b regarding electronic device detection can be sent to the drone system 2 for analysis.

In some embodiments, a first drone 4a includes a camera system 41 with one or more cameras 42a, 42b and equipment necessary to operate the cameras 42a, 42b including memory and software. Some embodiments comprise flying, by the drone system 2, the first drone 4a above an avalanche zone 50 and identifying, by the drone system 2, an avalanche victim search area 52. Some embodiments comprise autonomously flying the first drone 4a above an avalanche zone 50. Some embodiments comprise autonomously flying, via remote control or radio control by a person, the first drone 4a above an avalanche zone 50.

Some embodiments enable finding the avalanche victim 57 within the avalanche victim search area 52.

In some embodiments, a first drone 4a comprises an electronic device detection system 5. The electronic device detection system 5 can be used to detect electronic devices 82a, 82b, 82d in the possession of people 77a, 77b, 77d in the avalanche victim search area 52.

Electronic devices 82a, 82b, 82d can be cellular phones such as iPhones and Android phones; AirTags (made by Apple); active and passive RFIDs which can be included in ski passes, clothing, helmets, and in any other devices; radio devices; satellite communication devices; and many other types of electronic devices.

In some embodiments, an electronic device detection system 5 comprise an antenna 150, a cellular transmitter 151, a cellular receiver 152, a satellite transmitter 153, a satellite receiver 154, a radio transmitter 155, a radio receiver 88, an RFID radio transponder 156, an RFID radio receiver 157, and an RFID transmitter 158, and RFID reader 159.

RFID readers 159 are sometimes called interrogators. Some RFID embodiments include passive readers and active tags. Some RFID embodiments include active readers and passive tags. Some RFID embodiments include active readers and active tags.

Embodiments can comprise searching, by the first drone 4a, for an avalanche victim 57 in the avalanche victim search area 52. The first drone 4a can identify people by taking a picture and analyzing the picture to determine if the picture shows people. The first drone 4a and/or the drone system 2 can use the electronic device detection system 5 to detect electronic devices 82a, 82b, 82d.

Some embodiments comprise determining an estimated location 75 of the avalanche victim 57 by taking at least one picture 40, by the first camera system 41, of at least a portion 76a of the avalanche victim search area 52; detecting, by the drone system 2, people 77a, 77b, 77c shown within the at least one picture 40; detecting, by the electronic device detection system 5, electronic devices 82a, 82b, 82d within the avalanche victim search area 52; determining that one 82d of the electronic devices 82a, 82b, 82d is not located adjacent to any of the people 77a, 77b, 77c shown within the at least one picture 40; and/or detecting a first location 83 of the one 82d of the electronic devices 82a, 82b, 82d.

Some embodiments comprise determining an estimated location 75 of the avalanche victim 57 by taking at least one picture 40, by the first camera system 41, of at least a portion 76a of the avalanche victim search area 52; detecting, by the drone system 2, people 77a, 77b, 77c shown within the at least one picture 40; detecting, by the electronic device detection system 5, electronic devices 82a, 82b, 82d within the avalanche victim search area 52; determining that one 82d of the electronic devices 82a, 82b, 82d is not located within 5 meters, within 10 meters, and/or within 17 meters of any of the people 77a, 77b, 77c shown within the at least one picture 40; and/or detecting a first location 83 of the one 82d of the electronic devices 82a, 82b, 82d.

A cellular communication detector 86 can be configured to detect cellular communications 97 from mobile phones 87.

In some embodiments, an electronic device detection system 5 comprises a cellular communication detector 86 configured to detect a mobile phone 87. Detecting the electronic devices 82a, 82b, 82d within the avalanche victim search area 52 can comprise detecting, by the cellular communication detector 86 of the first drone 4a, the mobile phone 87. The one 82d of the electronic devices 82a, 82b, 82d can be the mobile phone 87. Detecting the first location 83 of the one 82d of the electronic devices 82a, 82b, 82d can comprise detecting the first location 83 of the mobile phone 87.

In some cases, the one 82d of the electronic devices 82a, 82b, 82d is a radio communication device 89 that sends radio communications 90. The radio communication device 89 can comprise a source 91 of radio transmissions 92.

In some embodiments, the electronic device detection system 5 comprises a radio receiver configured to detect at least one radio communication 90. Detecting the electronic devices 82a, 82b, 82d within the avalanche victim search area 52 can comprise detecting, by the radio receiver 88 of the first drone 4a, the at least one radio communication 90 from the electronic devices 82a, 82b, 82d. The one 82d of the electronic devices 82a, 82b, 82d can be a radio communication device 89, and detecting the first location 83 of the one 82d of the electronic devices 82a, 82b, 82d can comprise detecting a source 91 of at least one radio transmission 92 from the radio communication device 89.

Bluetooth can use ultra-high frequency (UHF) radio waves, which are electromagnetic waves with frequencies between 2 gigahertz and 3.5 gigahertz and often with frequencies between 2.4 gigahertz and 2.5 gigahertz. The electronic device detection system 5 can detect electromagnetic waves with frequencies between 2 gigahertz and 3.5 gigahertz.

In some embodiments, detecting the source 91 of the at least one radio transmission 92 comprises detecting ultra-high frequency radio waves between 2.1 gigahertz and 3.5 gigahertz.

Some embodiments detect ultra-wideband radio communications between 6.2 gigahertz and 7.8 gigahertz. The electronic device detection system 5 can detect radio communications with frequencies between 2 gigahertz and 3.5 gigahertz and also between 6.2 gigahertz and 7.8 gigahertz.

In some embodiments, detecting the source 91 of the at least one radio transmission 92 comprises detecting ultra-high frequency radio waves between 6.2 gigahertz and 7.8 gigahertz.

In some embodiments, electronic devices 82a, 82b, 82d are satellite communication devices 99.

Some embodiments use radio-frequency identification (RFID) tags 98. In some embodiments, electronic devices 82a, 82b, 82d are radio-frequency identification (RFID) tags 98 located inside ski passes. The RFID tags 98 can be active or passive. An electromagnetic interrogation pulse 93 from the electronic device detection system 5 can cause the RFID tags 98 to emit a signal 96 that is detected by the electronic device detection system 5.

In some embodiments, detecting the electronic devices 82a, 82b, 82d within the avalanche victim search area 52 comprises emitting, by the first drone 4a, at least one electromagnetic interrogation pulse 93, and receiving, by the first drone 4a, a signal 96 from the one 82d of the electronic devices 82a, 82b, 82d in response to emitting the at least one electromagnetic interrogation pulse 93.

Some embodiments comprise innovative flight paths that are helpful to detect avalanche victims 57.

In some embodiments, detecting, by the electronic device detection system 5, the electronic devices 82a, 82b, 82d within the avalanche victim search area 52 comprises autonomously flying, by the drone system 2, the first drone 4a along a first path 101 that is inwardly offset from a perimeter 100 of the avalanche victim search area 52; autonomously flying, by the drone system 2, the first drone 4a along a second path 102 that is inwardly offset from the first path 101; and autonomously flying, by the drone system 2, the first drone 4a along a third path 103 that is inwardly offset from the second path 102.

In some embodiments, detecting, by the electronic device detection system 5, the electronic devices 82a, 82b, 82d within the avalanche victim search area 52 comprises autonomously flying, by the drone system 2, the first drone 4a along a horizontally undulating path 104 over the avalanche victim search area 52 while detecting, by the electronic device detection system 5, the electronic devices 82a, 82b, 82d.

As used herein, whether a flight path is "horizontally undulating" is judged from a view directly above the drone 4a at a fixed distance of 30 meters from the drone 4a such that altitude changes do not make a path "horizontally undulating."

In some embodiments, detecting the first location 83 of the one 82d of the electronic devices 82a, 82b, 82d comprises detecting, by the first drone 4a while flying along a first path 105, a first signal strength variation 107 from the one 82d of the electronic devices 82a, 82b, 82d; determining a second location 109 of a first peak 110 of the first signal strength variation 107; detecting, by the first drone 4*a* while flying along a second path 106, a second signal strength variation 108 from the one 82*d* of the electronic devices 82*a*, 82*b*, 82*d*; and determining a third location 111 of a second peak 112 of the second signal strength variation 108.

Some embodiments comprise detecting, by the first drone 4*a* while flying along a third path 117 between the second location 109 and the third location 111, a third signal strength variation from the one 82*d* of the electronic devices 82*a*, 82*b*, 82*d*, and determining a fourth location 115 of a third peak 116 of the third signal strength variation 113, wherein the fourth location 115 is the first location 83 of the one 82*d* of the electronic devices 82*a*, 82*b*, 82*d*.

Calculating the estimated location 75 of the avalanche victim 57 is less complex when the second path 106 is perpendicular to the first path 105. In some embodiments, the first path 105 and the second path 106 intersect. In some embodiments, the second path 106 is perpendicular to the first path 105. In some embodiments, the first path 105 and the second path 106 intersect at an angle 119 that is greater than 70 degrees and less than 110 degrees.

In some embodiments, detecting the first location 83 of the one 82*d* of the electronic devices 82*a*, 82*b*, 82*d* comprises detecting, by the first drone 4*a* while flying along a first path 105, a first signal strength variation 107 from the one 82*d* of the electronic devices 82*a*, 82*b*, 82*d*; determining a second location 109 that corresponds with a first peak 110 of the first signal strength variation 107; detecting, by the first drone 4*a* while flying along a second path 106, a second signal strength variation 108 from the one 82*d* of the electronic devices 82*a*, 82*b*, 82*d*; determining a third location 111 that corresponds with a second peak 112 of the second signal strength variation 108; calculating a first direction 121 that is perpendicular to the first path 105 and that crosses the first path 105 at the second location 109; calculating a second direction 120 that is perpendicular to the second path 106 and that crosses the second path 106 at the third location 111; and determining a fifth location 122 where the first direction 121 intersects the second direction 120, wherein the fifth location 122 is the first location 83 of the one 82*d* of the electronic devices 82*a*, 82*b*, 82*d*.

In some embodiments, the drone system 2 uses one or more drones 4*a*, 4*b* to drop markers 126 on the location of the avalanche victim 57 and/or around the location of the avalanche victim 57. People 77*a*, 77*b*, 77*c* can use the markers 126 to know where to dig through the snow to save the avalanche victim 57. In some embodiments, the markers 126 are flags, paint, and/or powder 130*a*, 130*b*.

The powder 130*a*, 130*b* can comprise a bright-colored dye. Red and blue dyes are particularly visible in a snowy mountain environment with evergreen trees.

In some embodiments, the markers 126 are digital markers such as GPS coordinates that can be shared with electronic devices 82*a*, 82*b* of people 77*a*, 77*b* searching for the avalanche victim 57.

Some embodiments comprise dropping, by the first drone 4*a*, a marker 126 on the first location 83 in response to detecting the first location 83 of the one 82*d* of the electronic devices 82*a*, 82*b*, 82*d*.

The first location 83 can be an area that is 1.5 meters or less wide, 1 meter or less in diameter, 3 meters or less wide, and/or 5 meters or less in diameter.

In some embodiments, the first drone 4*a* comprises a powder container 133. Some embodiments comprise dropping, by the first drone 4*a* from the powder container 133, a powder at least two locations 135, 136 such that the first location 83 is between the at least two locations 135, 136.

This way, the rescuers can dig between the two locations 135, 136 without destroying the powder markers and thereby losing track of where they should be digging.

In some embodiments, a first drone 4*a* comprises a powder container 133 having an orifice 137 and a wheel 138 configured to impede a powder 130*a* from exiting the orifice 137. Some embodiments comprise dropping the powder 130*a* along a first path 141 by rotating the wheel 138 and dropping the powder 130*a* along a second path 142 by rotating the wheel 138. The first path and the second path 142 can intersect. The first path 141 and the second path 142 can cross over the first location 83. The first path 141 and the second path 142 can form a cross shape or any other shape.

The first drone 4*a* can comprise a motor 160. A shaft 161 can couple the wheel 138 to the motor 160. The motor 160 can rotate the shaft 161 to rotate the wheel 138.

In some embodiments, the first drone 4*a* comprises a powder container 133 having an orifice 137 and a wheel 138 configured to impede a powder 130*a* from exiting the orifice 137. Some embodiments comprise dropping the powder 130*a* along a first path 143 around the first location 83 by rotating the wheel 138 and dropping the powder 130*a* along a second path 144 around the first location 83 by rotating the wheel 138. The second path 144 can be outwardly offset from the first path 143.

Some embodiments comprise dropping the powder 130*a* along a third path 145 around the first location 83 by rotating the wheel 138 and dropping the powder 130*a* along a fourth path 146 around the first location 83 by rotating the wheel 138. The third path 145 can be outwardly offset from the second path. The fourth path 146 can be outwardly offset from the third path 145.

The paths 143, 144, 145, 146 can be concentric. The paths 143, 144, 145, 146 can be circular. The paths 143, 144, 145, 146 can be curved. Each path 143, 144, 145, 146 can be a loop. Each path 143, 144, 145, 146 can be a closed or partly open curve. In some embodiments, the paths 143, 144, 145, 146 are concentric rings that form a bullseye on the location of the avalanche victim 57.

In some embodiments, a drone system 2 comprises a first drone 4*a* configured to fly. The first drone 4*a* can comprise a first camera system 41 having one or more cameras 42*a*, 42*b*. Embodiments can comprise flying, by the drone system 2, the first drone 4*a* above an avalanche zone 50 and identifying, by the drone system 2, an avalanche victim search area 52.

In some embodiments, the first drone 4*a* comprises an electronic device detection system 5. Some embodiments comprise searching, by the first drone 4*a*, for an avalanche victim 57 in the avalanche victim search area 52.

Some embodiments comprise determining an estimated location 75 of the avalanche victim 57 by taking at least one picture 40, by the first camera system 41 of the first drone 4*a*, of at least a portion 76*b* of the avalanche victim search area 52; detecting, by the electronic device detection system 5, an electronic device 82*d* within the portion 76*b* of the avalanche victim search area 52; and determining, by the drone system 2, that the at least one picture 40 does not show a person 77*d* (e.g., the avalanche victim 57) with the portion 76*b*.

Some embodiments comprise automatically dropping, by the first drone 4*a* or by any of the drones of the drone system 2, a marker 126 on the estimated location 75 in response to determining the estimated location 75.

In some embodiments, a drone 4*a* is configured to help an avalanche victim 57 by identifying an estimated location 75 of the avalanche victim 57. A drone 4*a* can comprise at least one propeller 200 configured to enable the drone 4a to fly and a camera system 41 having one or more cameras 42a, 42b.

Some embodiments comprise an electronic device detection system 5, at least one marker configured to be dropped by the drone 4a, and program instructions 202. Program instructions 202 can be configured to take at least one picture 40, by the camera system 41; detect, by the electronic device detection system 5, an electronic device 82d at a first location 83; and determine (by the program instructions 202) that the at least one picture 40 does not show a person 77d at the first location 83.

Program instructions 202 can be configured to drop the at least one marker 126 to mark the first location 83 in response to the program instructions 202 taking the at least one picture 40, detecting the electronic device 82d at the first location 83, and determining that the at least one picture 40 does not show the person 77d at the first location 83.

In some embodiments, an electronic device detection system 5 comprises a cellular communication detector 86 configured to detect a mobile phone 87, and the program instructions 202 are configured to detect the electronic device 82d at the first location 83 by detecting, by the cellular communication detector 86, the mobile phone 87 at the first location 83.

In some embodiments, an electronic device detection system 5 comprises a radio receiver 88 configured to detect at least one radio communication 90, and the program instructions 202 are configured to detect the electronic device 82d at the first location 83 by detecting, by the radio receiver 88, the at least one radio communication 90 at the first location 83.

In some embodiments, the electronic device detection system 5 comprises an electromagnetic interrogation pulse emitter 205 and an antenna 150, and the program instructions 202 are configured to detect the electronic device 82d at the first location 83 by emitting, by the electromagnetic interrogation pulse emitter 205, an electromagnetic interrogation pulse 93 and then in response detecting, by the antenna 150, a signal 96 from the electronic device 82d.

Some embodiments comprise at least one memory 204 having the program instructions 202 and at least one processor 203 configured to execute the program instructions 202.

In some embodiments, the at least one marker 126 comprises at least one flag 201. In some embodiments, the at least one marker 126 comprises powder 130a. In some embodiments, the powder 130a comprises a dye to color the powder 130a. In some embodiments, the powder 130a comprises salt.

In some embodiments, the at least one marker 126 comprises a liquid 209. In some embodiments, the liquid 209 is paint 210, which can be biodegradable and safe for the environment. In some embodiments, the liquid 209 is colored with dye to make the liquid 209 easy to see on the snow. In some embodiments, the liquid 209 is pressurized to encourage the liquid 209 to spray out of the drone 4a.

In some embodiments, the drone 4a comprises a housing 211, a battery 212 located inside the housing 211, and a container 133 coupled to the housing 211. At least one propeller 200 can be coupled to the housing 211. The container 133 can comprise a funnel 134 having an inside area 213 configured to hold a marker 126.

In some embodiments, the container 133 comprises an exit 215 that is fluidly coupled to the inside area 213 such that the marker 126 can leave the container 133 through the exit 215 to mark a location. The exit 215 can comprise a cylindrical channel 216 and a distal end 217 where the powder 130a leaves the container 133. The at least one marker 126 can comprise a powder 130a located in the inside area 213 of the funnel 134. The funnel 134 can be oriented to direct the powder 130a out of the exit 215 via gravity.

A spherical wheel 138 can comprise cavities 221a, 221b, 221c, 221d around an outer perimeter 220 of the spherical wheel 138. As used herein, the outer perimeter 220 of the spherical wheel 138 is defined as "outer" relative to the spherical wheel's 138 axis of rotation 222. As illustrated herein, each of the 221a, 221b, 221c, 221d have an identical shape, but in some embodiments, cavities can have different shapes.

Figure 5:
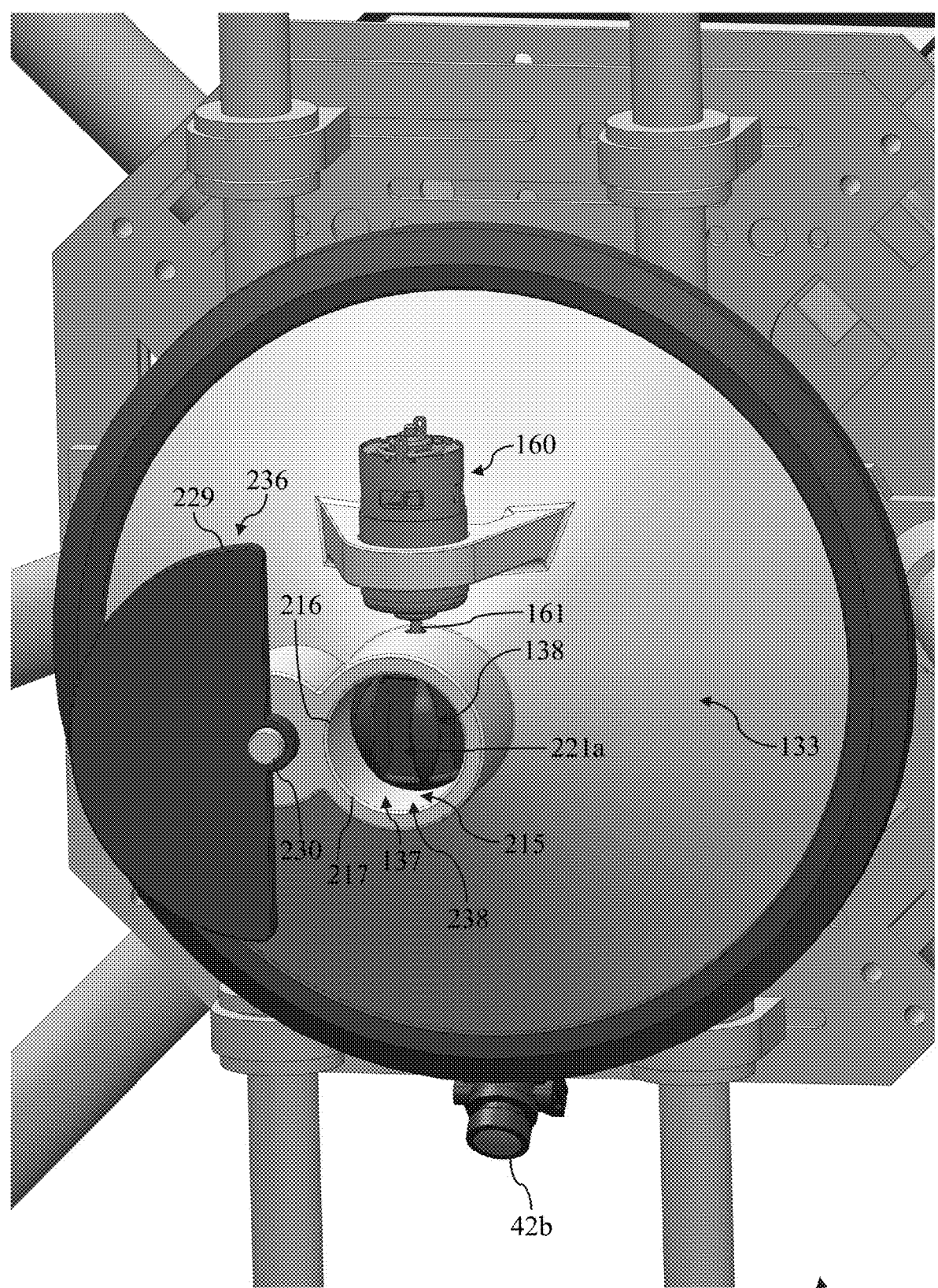
FIG. 5 illustrates a perspective view of portions of a drone, according to some embodiments.
Figure 6:
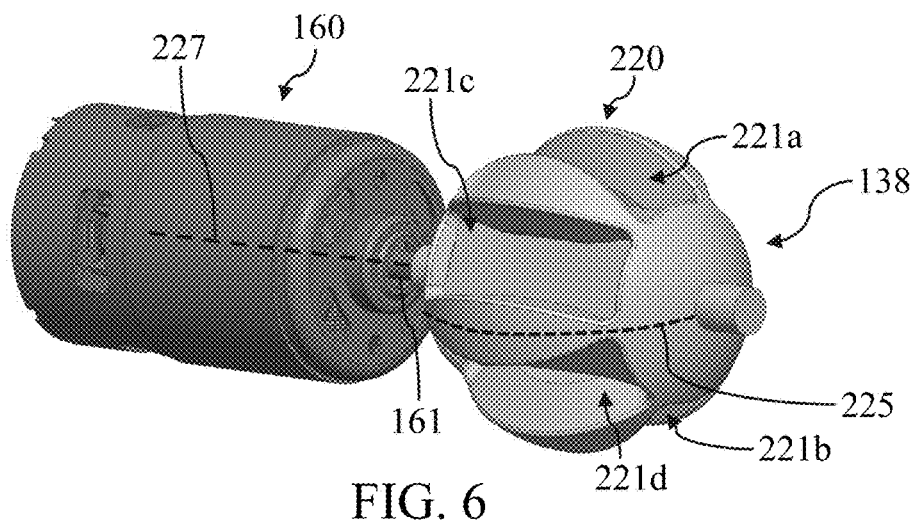
FIG. 6 illustrates a perspective view of a wheel, motor, and shaft while other elements of a drone are hidden, according to some embodiments.
Figure 7:
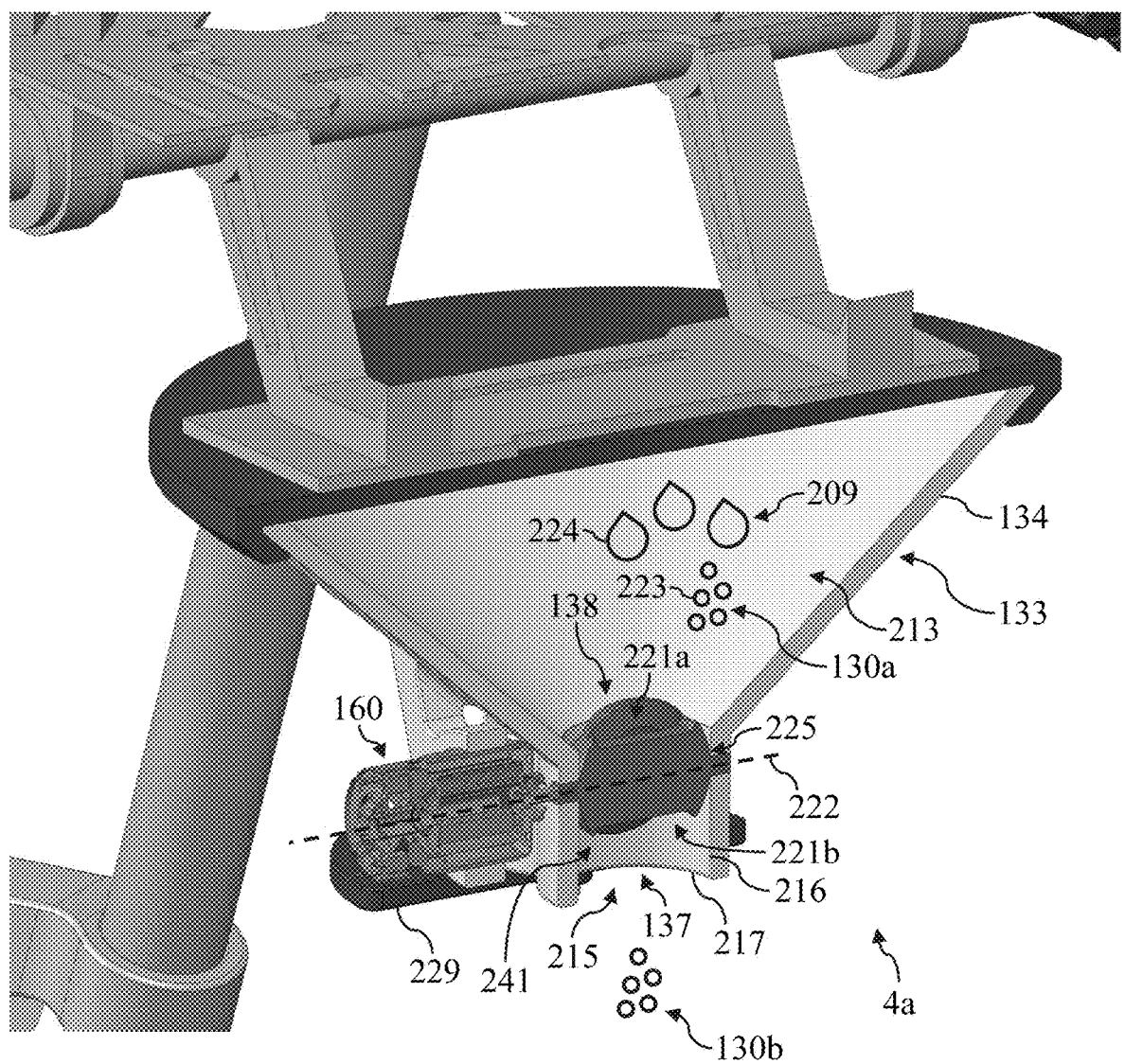
FIG. 7 illustrates a cross-sectional, perspective view taken through the middle of the wheel of portions of a drone, according to some embodiments.
Figure 8:
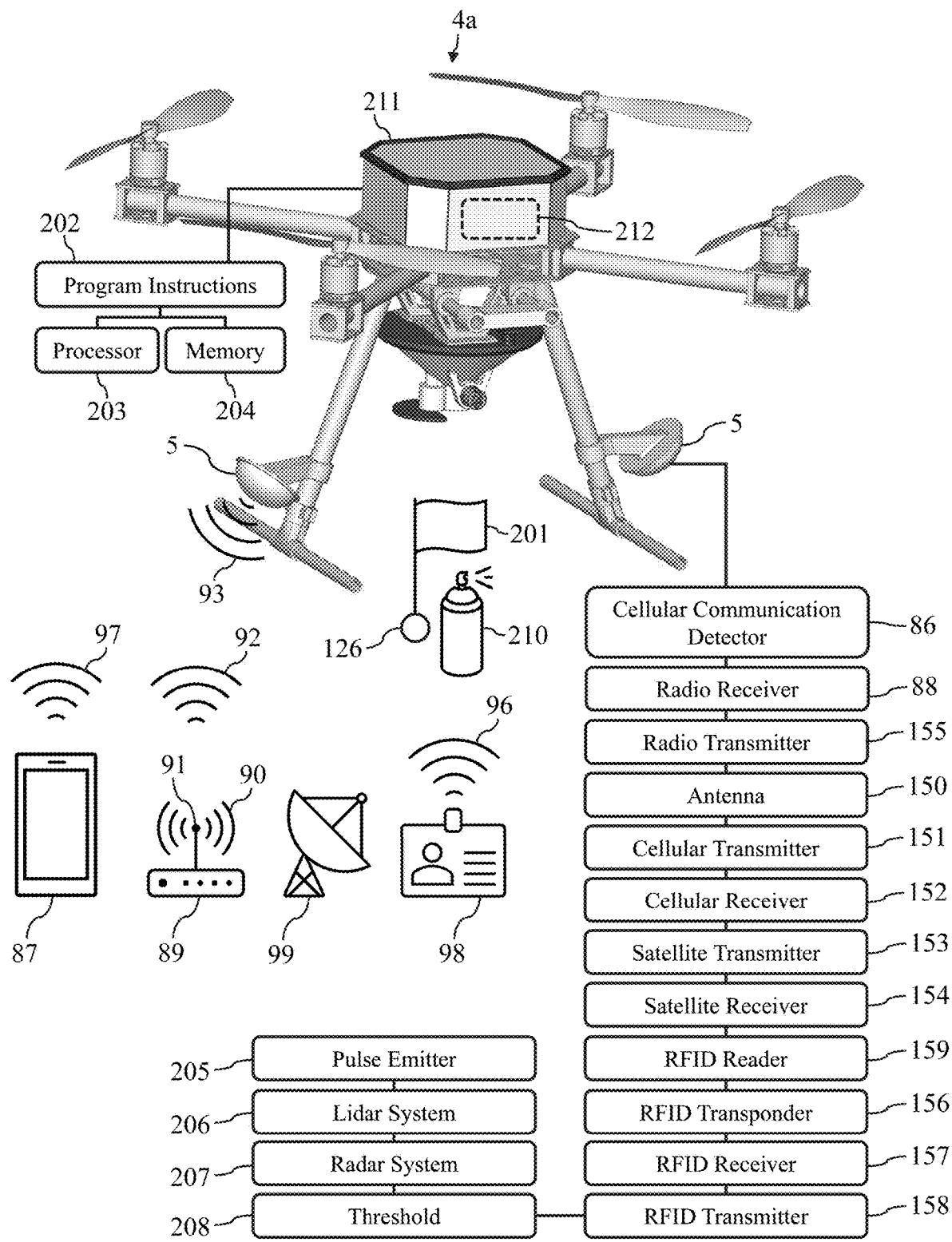
FIG. 8 illustrates a diagrammatic view that includes a drone having an electronic device detection system, according to some embodiments.
Figure 9:
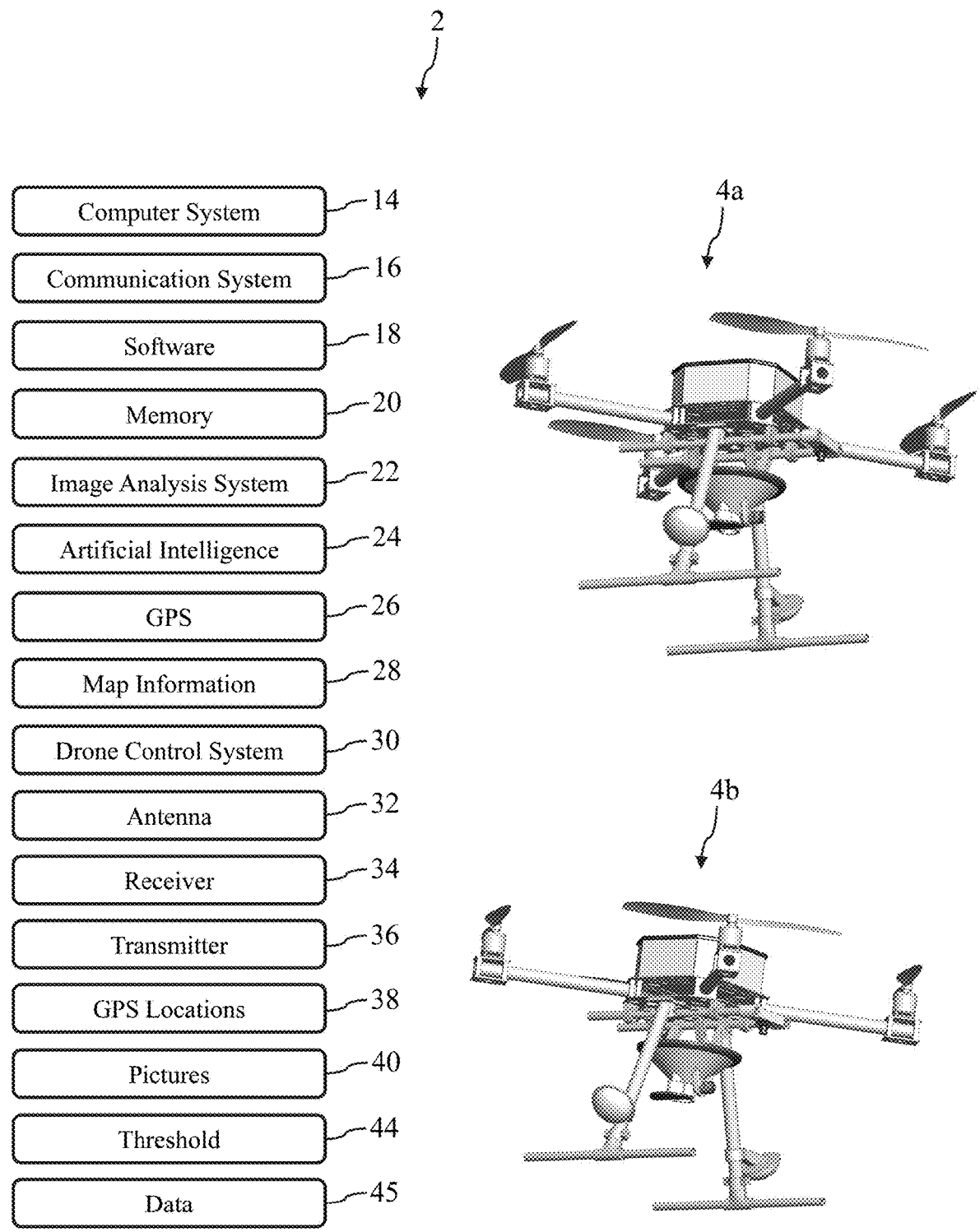
FIG. 9 illustrates a diagrammatic view of a drone system, according to some embodiments.
Figure 10:
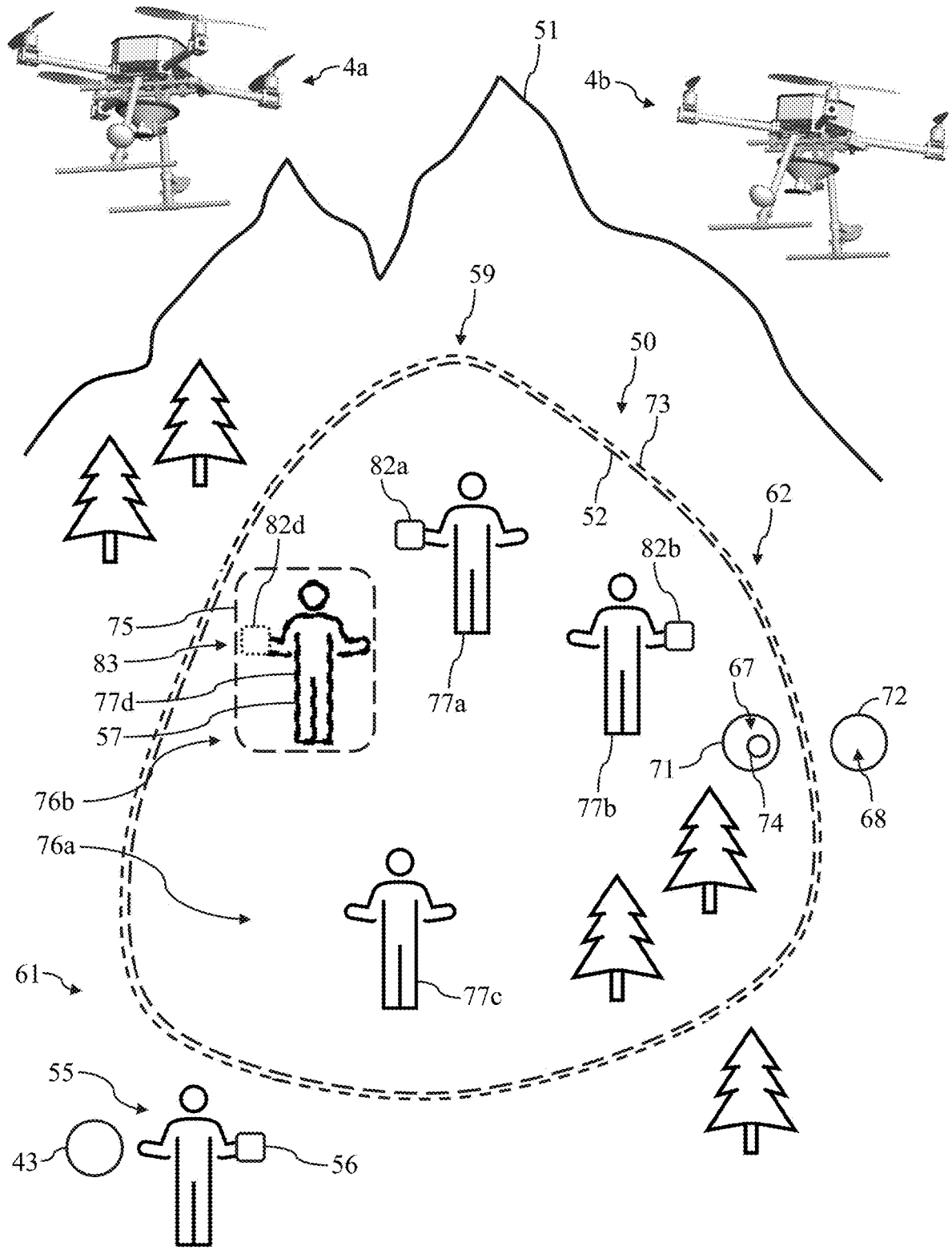
FIGS. 10-13 illustrate diagrammatic views of a drone system searching for an avalanche victim, according to some embodiments.
Figure 11:
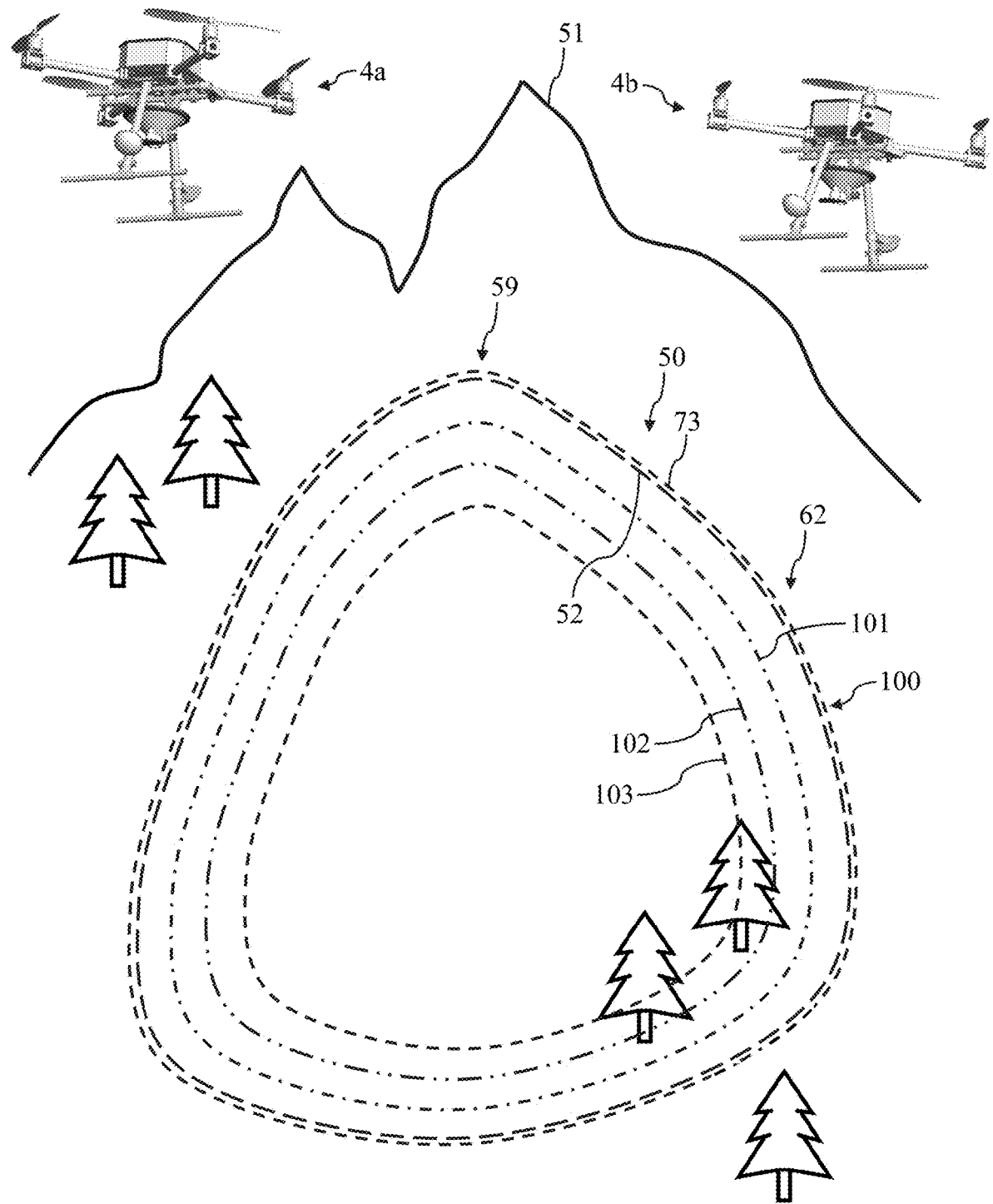
Figure 12:
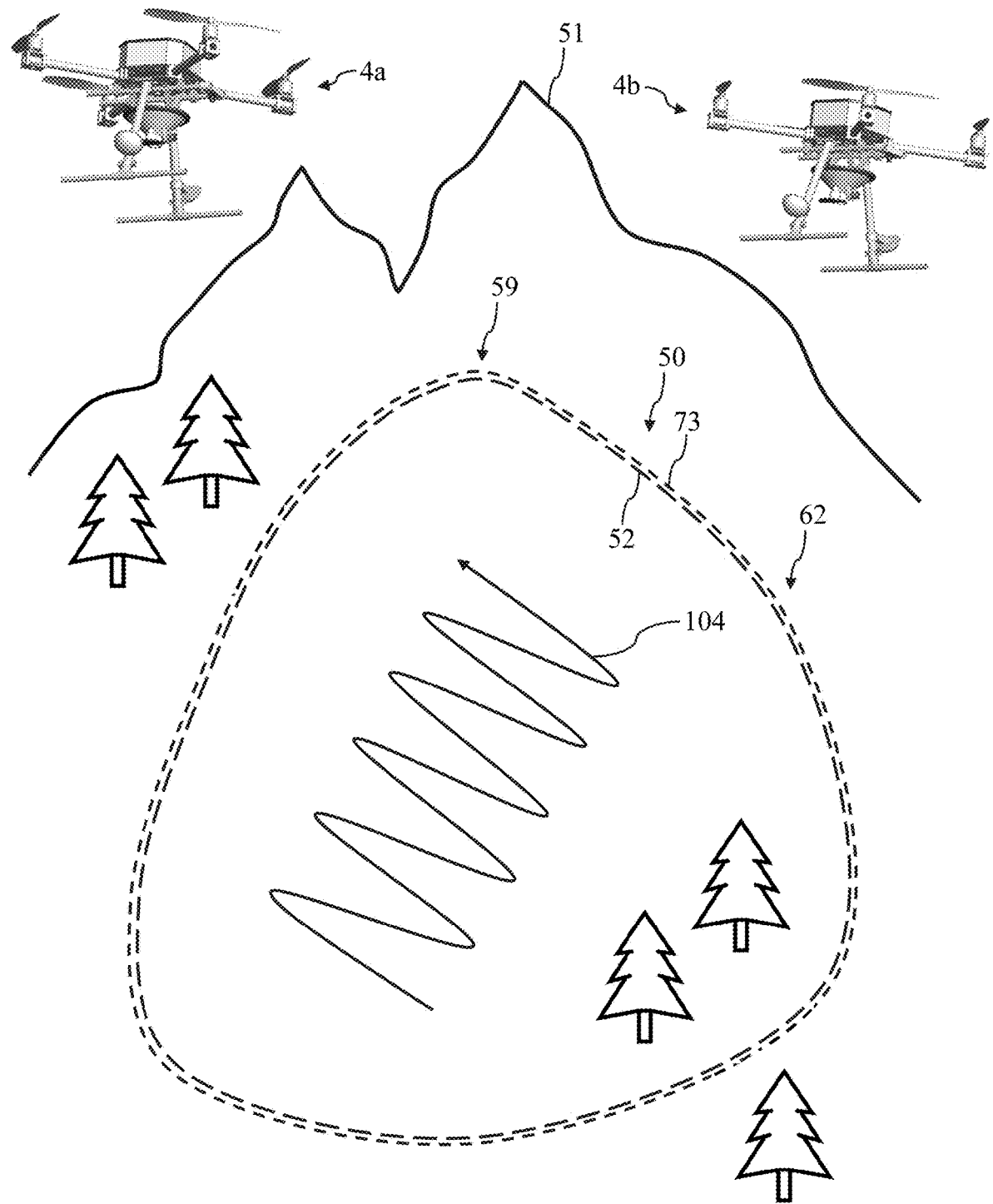
Figure 13:
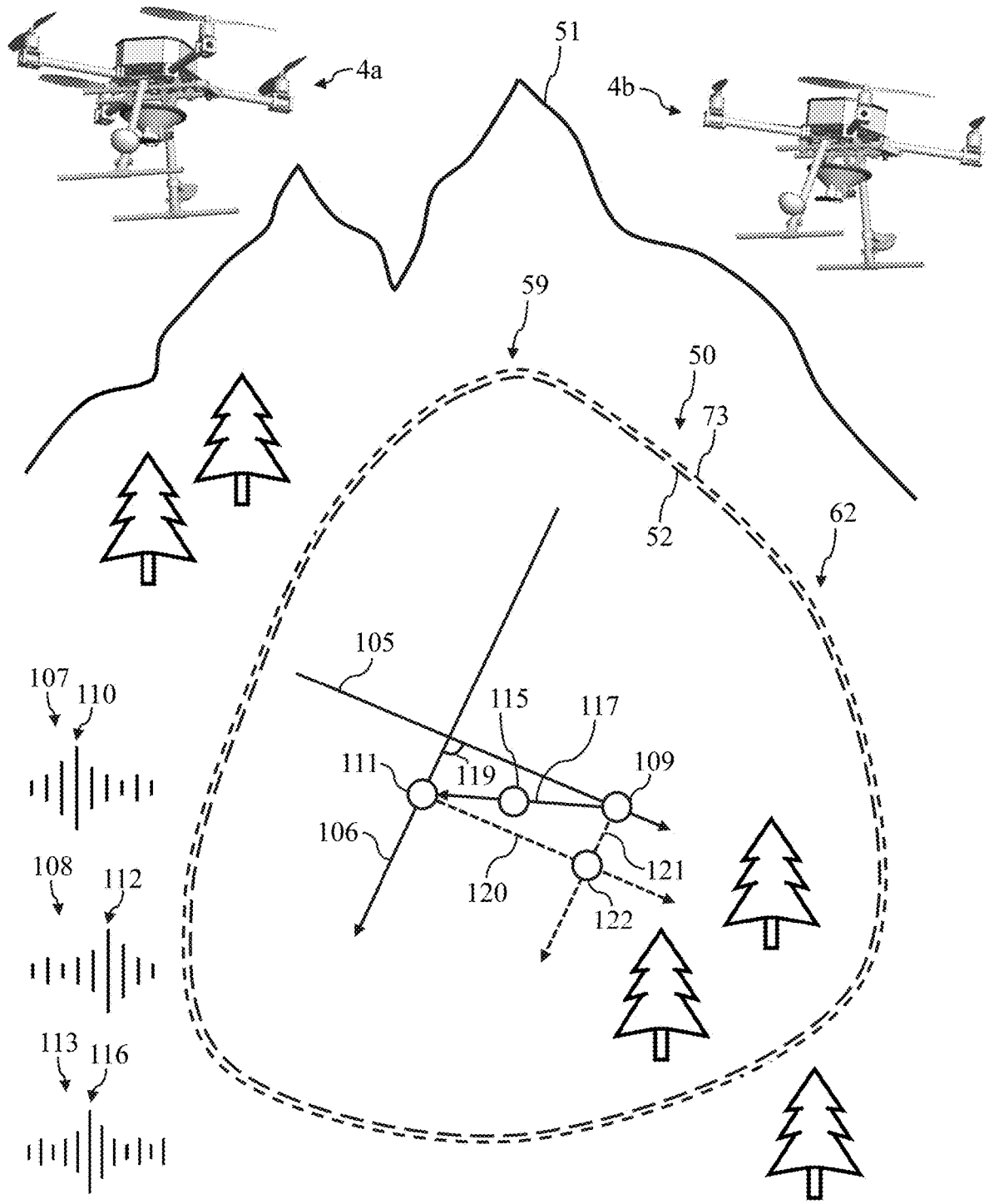
Figure 14:
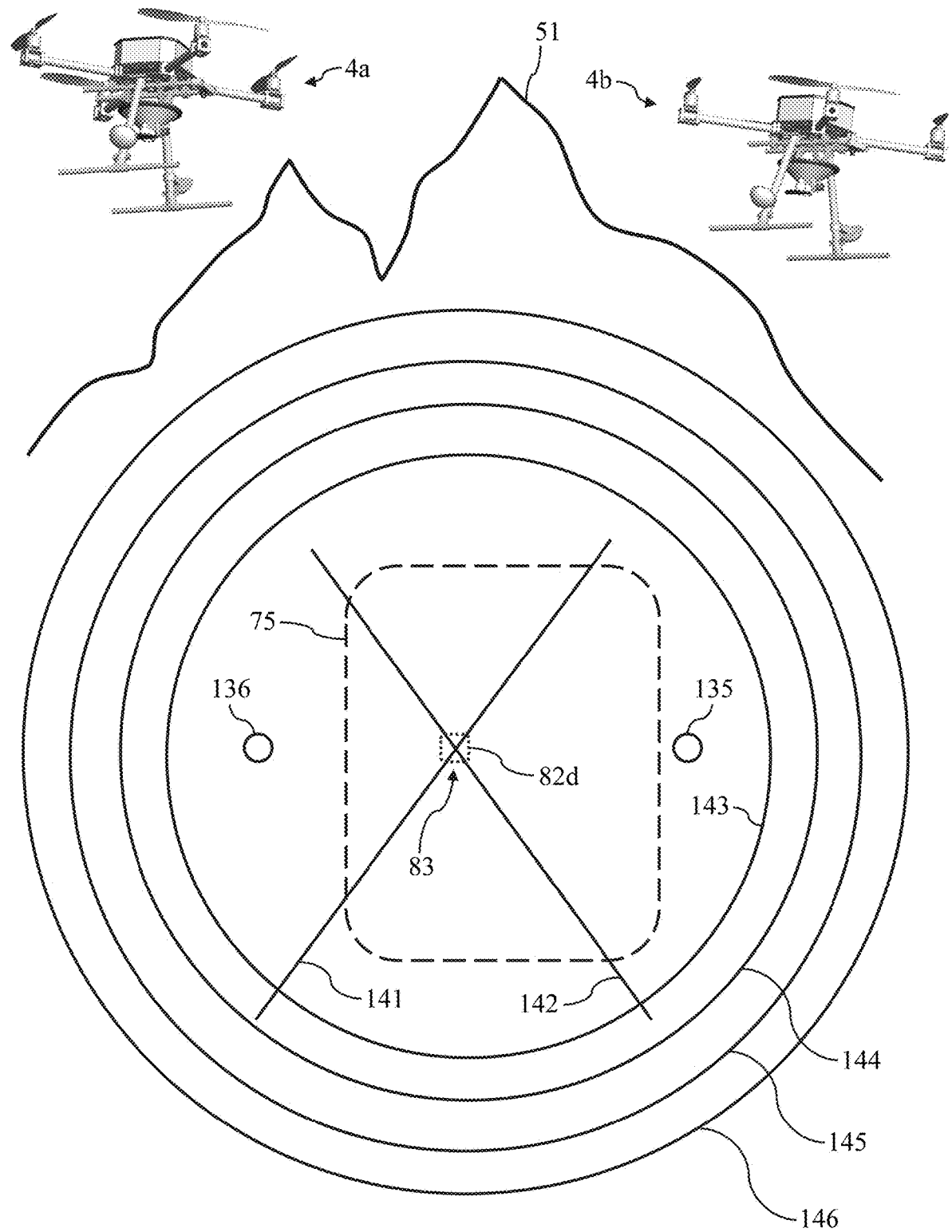
FIG. 14 illustrates a diagrammatic view of a drone system marking a location of an avalanche victim, according to some embodiments.

Powder 130a and/or liquid 209 can enter a first cavity 221a when the first cavity 221a is oriented as illustrated in FIG. 7, then the spherical wheel 138 can rotate (due to program instructions 202 and/or the motor 160 causing the rotation) such that the powder 130a and/or liquid 209 falls out through an orifice 137 of a distal end 217 when the first cavity 221a is oriented toward the distal end 217 (like a second cavity 221b is oriented in FIG. 7 and like the first cavity 221a is oriented in FIG. 5).

In some embodiments, the drone 4a comprises a motor 160 and a spherical wheel 138 having an outer perimeter 220 that comprises a first cavity 221a and a second cavity 221b.

In some embodiments, the motor 160 is coupled to the housing 211 and configured to rotate the spherical wheel 138. As illustrated in FIGS. 5 and 7, the spherical wheel 138 can be located at least partially in the cylindrical channel 216 such that the spherical wheel 138 is configured to block the powder 130a from passing through the exit 215 while the spherical wheel 138 is not rotating relative to the cylindrical channel 216.

In some embodiments, program instructions 202 are configured to drop the at least one marker 126 by rotating the spherical wheel 138 by actuating the motor 160 to cause at least a portion 223 of the powder 130a to enter the first cavity 221a when the first cavity 221a is fluidly coupled with the inside area 213 of the funnel 134 (as illustrated in FIG. 7) and then exit the first cavity 221a when the first cavity 221a is oriented toward the distal end 217 (as illustrated in FIG. 5).

In some embodiments, program instructions 202 are configured to drop the at least one marker 126 by rotating the spherical wheel 138 by actuating the motor 160 to cause at least a portion 223 of the powder 130a to enter the second cavity 221b when the second cavity 221b is fluidly coupled with the inside area 213 of the funnel 134 and then exit the second cavity 221b when the second cavity 221b is oriented toward the distal end 217. The second cavity 221b can be located on an opposite side of the outer perimeter 220 relative to the first cavity 221a.

In some embodiments, program instructions 202 are configured to drop the at least one marker 126 by rotating the spherical wheel 138 by actuating the motor 160 to cause at least a portion 223 of the powder 130a to enter the first cavity 221a when the first cavity 221a is oriented toward the inside area 213 of the funnel 134 (as illustrated in FIG. 7) and then exit the first cavity 221a when the first cavity 221a is oriented toward the distal end 217 (as illustrated in FIG. 5).

In some embodiments, program instructions 202 are configured to drop the at least one marker 126 by rotating the spherical wheel 138 by actuating the motor 160 to cause at least a portion 223 of the powder 130a to enter the first cavity 221a when the first cavity 221a is fluidly coupled with the inside area 213 of the funnel 134 (as illustrated in FIG. 7) and then exit the first cavity 221a when the first cavity 221a is fluidly coupled with the distal end 217 (as illustrated in FIG. 5).

Some embodiments comprise a housing 211, a battery 212 located inside the housing 211, and a container 133 coupled to the housing 211. At least one propeller 200 can be coupled to the housing 211. The container 133 can comprise an inside area 213. The container 133 can comprise an exit 215 that is fluidly coupled to the inside area 213. The exit 215 can comprise a cylindrical channel 216 and a distal end 217. The at least one marker 126 can comprise a liquid 209 located in the inside area 213 of the container 133.

In some embodiments, the drone 4a comprises a motor 160 and a spherical wheel 138 having an outer perimeter 220 that comprises a first cavity 221a and a second cavity 221b. The motor 160 can be coupled to the housing 211. The motor 160 can be coupled to the container 133. The motor 160 can be configured to rotate the spherical wheel 138 (due to the program instructions 202 actuating the motor 160). The spherical wheel 138 can be located at least partially in the cylindrical channel 216 such that the spherical wheel 138 forms a seal 225 with at least a portion 226 of the cylindrical channel 216. (The portion 226 is on a wall of the cylindrical channel 216 that is not visible in FIG. 4, but to enable viewing the location of the portion 226 in FIG. 4, the line that depicts the portion 226 is shown as a hidden line that is hidden behind other features in FIG. 4.)

In some embodiments, the spherical wheel 138 is made from a rubber material and the spherical wheel 138 has a slight interference fit with the cylindrical channel 216. This interference fit can create compression to form the seal 225. In other embodiments, the seal 225 is a separate component such as an o-ring located in a trough of the cylindrical channel 216 such that one side of the o-ring contacts the trough of the cylindrical channel 216 and another side of the o-ring contacts the spherical wheel 138. The trough can have a rectangular cross section to provide room for the o-ring to deform due to contacting the spherical wheel 138.

In some embodiments, program instructions 202 are configured to drop the at least one marker 126 by rotating the spherical wheel 138 by actuating the motor 160 to cause at least a portion 224 of the liquid 209 to enter the first cavity 221a when the first cavity 221a is fluidly coupled with the inside area 213 and then exit the first cavity 221a when the first cavity 221a is oriented toward the distal end 217.

In some embodiments, program instructions 202 are configured to drop the at least one marker 126 by rotating the spherical wheel 138 by actuating the motor 160 to cause at least a portion 224 of the liquid 209 to enter the first cavity 221a when the first cavity 221a is oriented toward the inside area 213 and then exit the first cavity 221a when the first cavity 221a is oriented toward the distal end 217.

In some embodiments, program instructions 202 are configured to drop the at least one marker 126 by rotating the spherical wheel 138 by actuating the motor 160 to cause at least a portion 224 of the liquid 209 to enter the first cavity 221a when the first cavity 221a is fluidly coupled with the inside area 213 and then exit the first cavity 221a when the first cavity 221a is fluidly coupled to the distal end 217.

In some embodiments, a drone 4a comprises a container 133. The container 133 can comprise an inside area 213. The drone 4a can comprise an exit 215, and the exit 215 can be fluidly coupled to the inside area 213 to provide a way out of the inside area 213 (as illustrated in FIG. 7). The drone 4a can comprise a wheel 138 that covers at least a portion 241 of the exit 215, a first motor 160, and a first shaft 161 having a first axis of rotation 227. The first motor 160 can be coupled to the wheel 138 by the first shaft 161, and the program instructions 202 can be configured to rotate the wheel 138 by actuating the first motor 160 to drop the at least one marker 126 (out of the exit 215) to mark the first location 83.

In some embodiments, program instructions 202 are configured to rotate the wheel 138 to cause at least a portion 223 of the powder 130a and/or liquid 209 to enter the cavity 221a when the cavity 221a is fluidly coupled with the inside area 213 and then exit the cavity 221a when the cavity 221a is oriented toward the orifice 137 to mark the first location 83.

In some embodiments, at least one marker 126 comprises powder 130a located in the inside area 213, the exit 215 comprises an orifice 137, and the wheel 138 comprises an outer perimeter comprising a cavity 221a such that the drone 4a is configured such that the program instructions 202 rotating the wheel 138 cause at least a portion 223 of the powder 130a to enter the cavity 221a when the cavity 221a is fluidly coupled with the inside area 213 and then exit the cavity 221a when the cavity 221a is oriented toward the orifice 137 to mark the first location 83.

In some embodiments, an exit 215 comprises a cylindrical channel 216, the wheel 138 is spherical, and the wheel 138 is located at least partially in the cylindrical channel 216 to plug the cylindrical channel 216 to impede the powder 130a (and/or liquid 209) from exiting the cylindrical channel 216 when the wheel 138 is not rotating.

Figure 2:
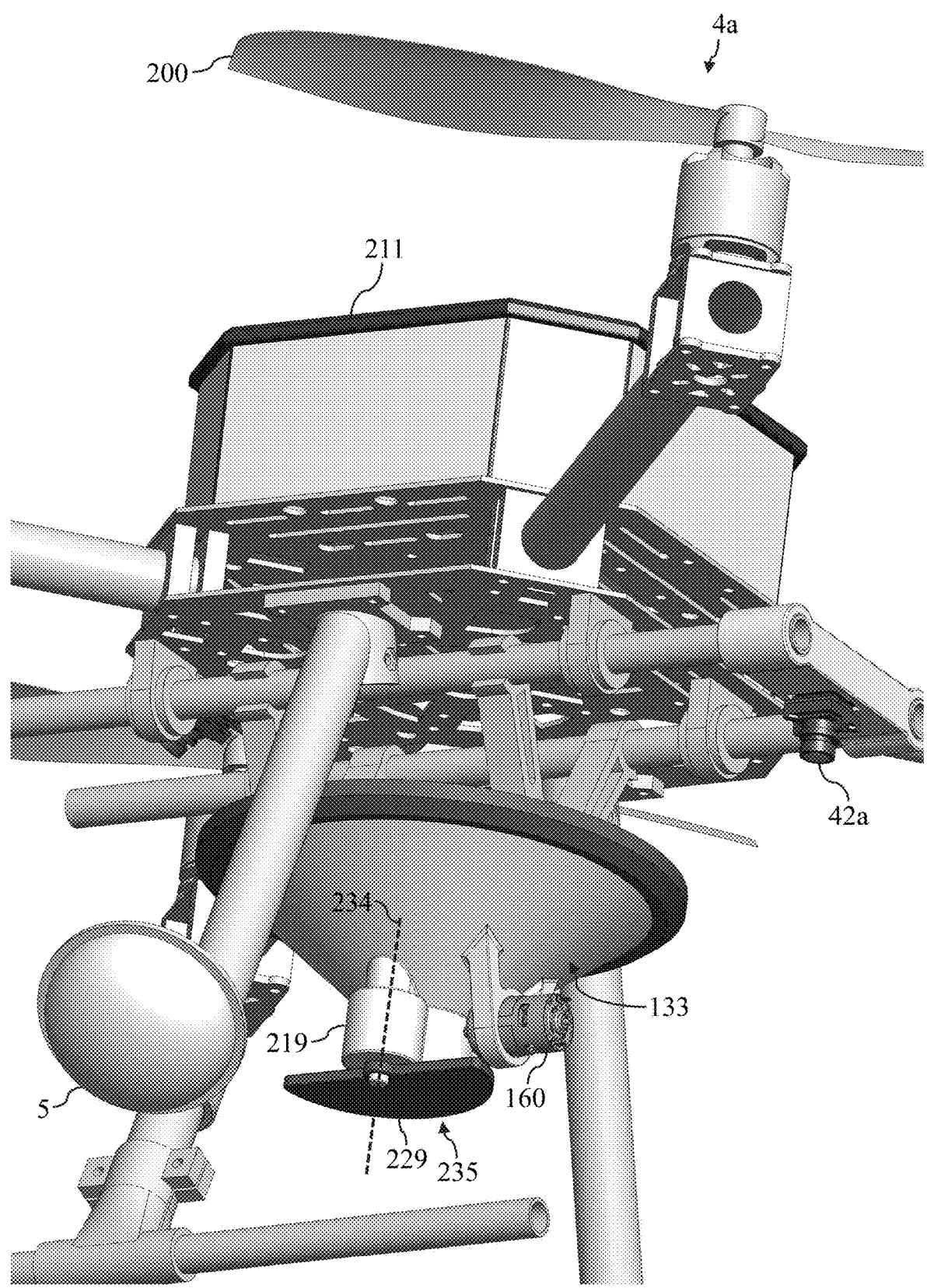
FIG. 2 illustrates a perspective view of portions of a drone, according to some embodiments.
Figure 3:
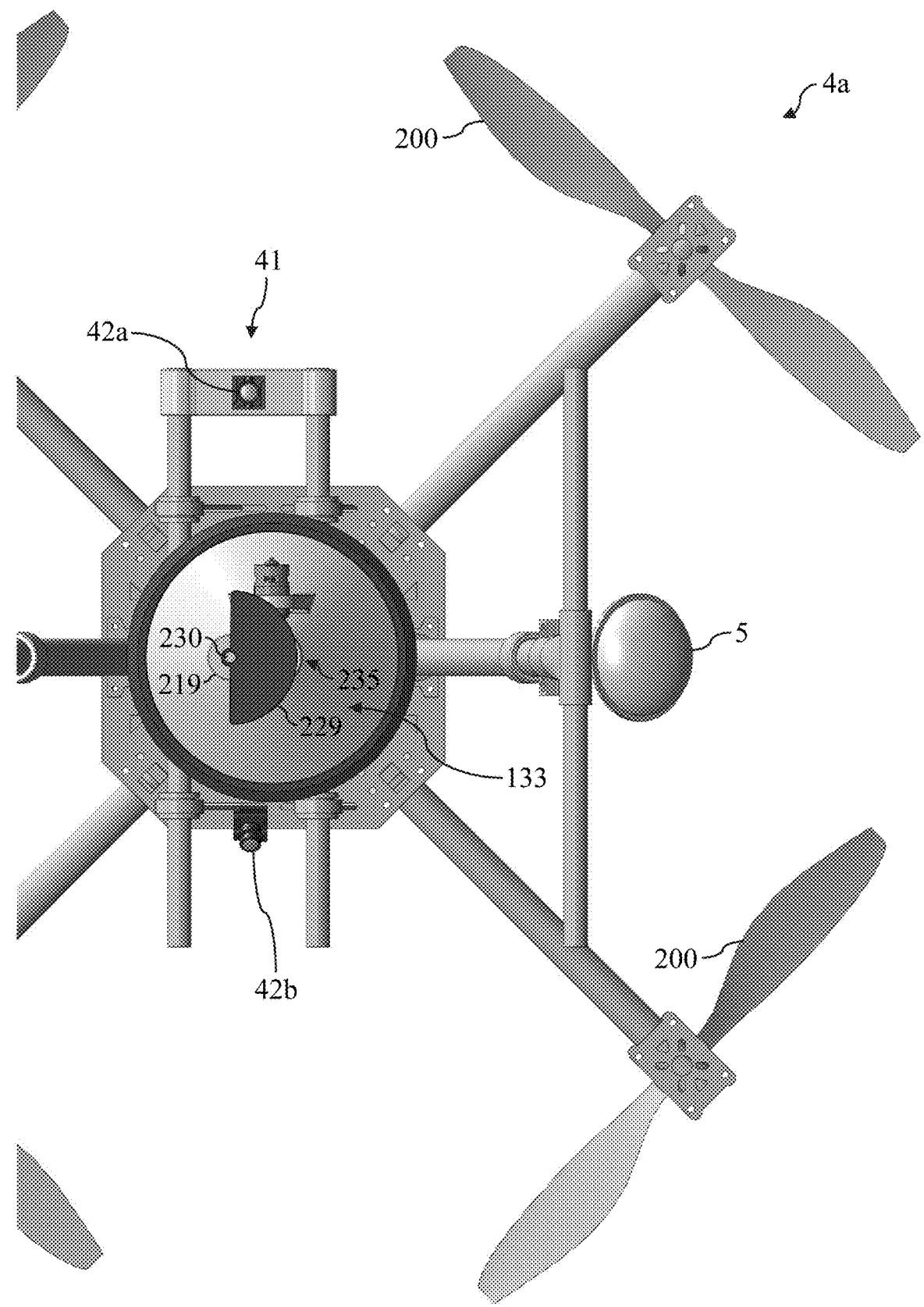
FIG. 3 illustrates a bottom view of portions of a drone, according to some embodiments.
Figure 4:
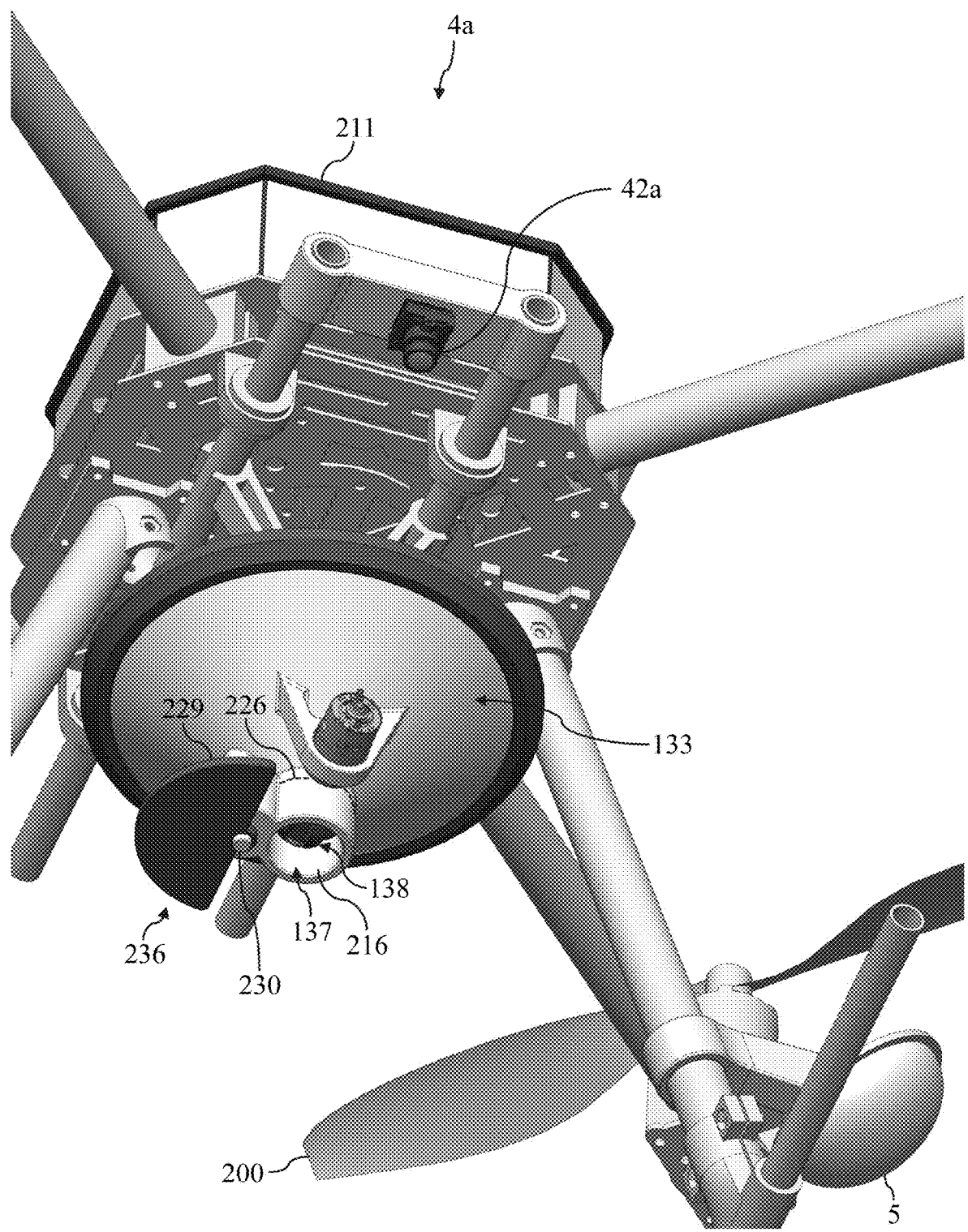
FIG. 4 illustrates a perspective view of portions of a drone, according to some embodiments.

Some embodiments comprise a second motor 219 coupled to a cover 229 by a second shaft 230 having a second axis of rotation 234. The cover 229 can be configured to move between a first position 235 where the cover 229 blocks the orifice 137 (for example, as illustrated in FIGS. 2 and 3) and a second position 236 where the cover 229 does not block at least a portion 238 of the orifice 137 (for example, as illustrated in FIGS. 4 and 5). Program instructions 202 can be configured to at least partially open the orifice 137 by actuating the second motor 219 to rotate the second shaft 230 (to move the cover 229 from the first position 235 to the second position 236) to enable the portion 223 of the powder 130a to fall from the drone 4a to mark the first location 83.

In some embodiments, the first motor 160 and the second motor 219 are coupled to the container 133, the second axis 234 is perpendicular to a first axis 227, the second axis 234 is perpendicular to a first axis 222, and the inside area 213 comprises a funnel 134 that directs the powder 130a toward the exit 215.

As illustrated in FIGS. 1 to 7, the cover 229 can be a flat, half cylinder with a thickness of less than 5 millimeters.

In some embodiments, a drone 4a is configured to help an avalanche victim 57 by identifying an estimated location 75 of the avalanche victim 57. A drone 4a can comprise at least one propeller 200 configured to enable the drone 4a to fly and a camera system 41 having one or more cameras 42a, 42b.

In some embodiments, a drone 4a comprises an electronic device detection system 5, a camera system 41, at least one marker 126 configured to be dropped by the drone 4a, and program instructions 202.

In some embodiments, program instructions 202 are configured to determine an estimated location 75 of the avalanche victim 57 by taking at least one picture 40, by the camera system 41, of an avalanche victim search area 52; detecting, by the electronic device detection system 5, an electronic device 82d within a portion 76b of the avalanche victim search area 52; and determining, by the program instructions 202, that the at least one picture 40 does not show a person 77*d* within the portion 76*b* of the avalanche victim search area 52. The program instructions 202 can be configured to drop the at least one marker 126 to mark the estimated location 75 in response to the program instructions 202 determining the estimated location 75 of the avalanche victim 57.

Snow that has not been moved by an avalanche typically has a smooth top surface while snow that has been moved by an avalanche typically has a much rougher top surface characterized by ridges, bumps, projections, and inequalities. Surface roughness 67 can be indicative of an avalanche 59 having occurred at the location where the surface roughness 67 is analyzed if the surface features have ridges, bumps, projections, and inequalities that are typical of snow that has been moved by an avalanche 59.

As used herein, lidar systems comprise light detection and ranging systems and laser imaging, detection, and ranging systems. A lidar system 206 comprises at least one laser and at least one laser sensor.

Some embodiments use a lidar system 206 coupled to the housing 211 of the drone 4*a*. A laser emits laser beams directed at the surface of the snow and a laser sensor then detects light bouncing back to the lidar system 206 to characterize the roughness of the surface of the snow. A rougher surface indicates that an avalanche occurred in the area (and in some cases can indicate the drone 4*a* should search the area for people trapped under the snow).

In some embodiments, a drone 4*a* comprises a lidar system 206. Program instructions 202 can be configured to identify the avalanche victim search area 52 by analyzing, using the lidar system 206, a surface roughness 67 of a snow ground layer 62 and determining that the surface roughness 67 is at least one of indicative of an avalanche 59 and greater than a predetermined threshold 208.

Radar is a radiolocation system that uses radio waves to determine the distance (ranging), angle (azimuth), and/or radial velocity of objects relative to the site. A radar system 207 can comprise a transmitter producing electromagnetic waves in the radio and/or microwave domain, a transmitting antenna, a receiving antenna, and/or a receiver and processor 203 to determine properties of objects. (The same antenna can be used for transmitting and receiving.)

Radio waves (which can be pulsed or continuous) from the transmitter reflect off the surface of the snow and return to the receiver, giving information about the roughness of the surface of the snow. A rougher surface indicates that an avalanche occurred in the area (and in some cases can indicate the drone 4*a* should search the area for people trapped under the snow). A radar system 207 can be coupled to the housing 211 of the drone 4*a*.

In some embodiments, a drone 4*a* comprises a radar system 207. Program instructions 202 can be configured to identify the avalanche victim search area 52 by analyzing, using the radar system 207, a surface roughness 67 of a snow ground layer 62 and determining that the surface roughness 67 is at least one of indicative of an avalanche 59 and greater than a predetermined threshold 208.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device.

Data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The invention claimed is:

1. A drone configured to help an avalanche victim, the drone comprising: at least one propeller configured to enable the drone to fly, a camera system, and an electronic device detection system, at least one marker configured to be dropped by the drone, and program instructions, wherein the program instructions are configured to take at least one picture, by the camera system; detect, by the electronic device detection system, an electronic device at a first location; and determine that the at least one picture does not show a person at the first location, and the program instructions are configured to drop the at least one marker to mark the first location in response to the program instructions taking the at least one picture, detecting the electronic device at the first location, and determining that the at least one picture does not show the person at the first location.

2. The drone of claim 1, wherein the electronic device detection system comprises a cellular communication detector configured to detect a mobile phone, and the program instructions are configured to detect the electronic device at the first location by detecting, by the cellular communication detector, the mobile phone at the first location.

3. The drone of claim 1, wherein the electronic device detection system comprises a radio receiver configured to detect at least one radio communication, and the program instructions are configured to detect the electronic device at the first location by detecting, by the radio receiver, the at least one radio communication at the first location.

4. The drone of claim 1, wherein the electronic device detection system comprises an electromagnetic interrogation pulse emitter and an antenna, and the program instructions are configured to detect the electronic device at the first location by emitting, by the electromagnetic interrogation pulse emitter, an electromagnetic interrogation pulse and then in response detecting, by the antenna, a signal from the electronic device.

5. The drone of claim 1, further comprising at least one memory having the program instructions and at least one processor configured to execute the program instructions.

6. The drone of claim 1, wherein the at least one marker comprises at least one flag.

7. The drone of claim 1, wherein the at least one marker comprises at least one of powder and a liquid.

8. The drone of claim 1, further comprising a housing, a battery located inside the housing, and a container coupled to the housing, wherein the at least one propeller is coupled to the housing, the container comprises a funnel having an inside area, the container comprises an exit that is fluidly coupled to the inside area, the exit comprises a cylindrical channel and a distal end, and the at least one marker comprises powder located in the inside area of the funnel, wherein the drone comprises a motor and a spherical wheel having an outer perimeter that comprises a first cavity, the motor is coupled to the housing and configured to rotate the spherical wheel, the spherical wheel is located at least partially in the cylindrical channel such that the spherical wheel is configured to block the powder from passing through the exit while the spherical wheel is not rotating relative to the cylindrical channel, wherein the program instructions are configured to drop the at least one marker by rotating the spherical wheel by actuating the motor to cause at least a portion of the powder to enter the first cavity when the first cavity is fluidly coupled with the inside area of the funnel and then exit the first cavity when the first cavity is oriented toward the distal end.

9. The drone of claim 1, further comprising a housing, a battery located inside the housing, and a container coupled to the housing, wherein the at least one propeller is coupled to the housing, the container comprises an inside area, the container comprises an exit that is fluidly coupled to the inside area, the exit comprises a cylindrical channel and a distal end, and the at least one marker comprises a liquid located in the inside area, wherein the drone comprises a motor and a spherical wheel having an outer perimeter that comprises a first cavity, the motor is coupled to the housing and configured to rotate the spherical wheel, the spherical wheel is located at least partially in the cylindrical channel such that the spherical wheel forms a seal with at least a portion of the cylindrical channel, wherein the program instructions are configured to drop the at least one marker by rotating the spherical wheel by actuating the motor to cause at least a portion of the liquid to enter the first cavity when the first cavity is fluidly coupled with the inside area and then exit the first cavity when the first cavity is oriented toward the distal end.

10. The drone of claim 1, further comprising a container, wherein the container comprises an inside area, wherein the drone comprises an exit fluidly coupled to the inside area, a wheel that covers at least a portion of the exit, a first motor, and a first shaft having a first axis of rotation, wherein the first motor is coupled to the wheel by the first shaft, and the program instructions are configured to rotate the wheel by actuating the first motor to drop the at least one marker to mark the first location.

11. The drone of claim 10, wherein the at least one marker comprises powder located in the inside area, the exit comprises an orifice, and the wheel comprises an outer perimeter comprising a cavity such that the drone is configured such that the program instructions rotating the wheel cause at least a portion of the powder to enter the cavity when the cavity is fluidly coupled with the inside area and then exit the cavity when the cavity is oriented toward the orifice to mark the first location.

12. The drone of claim 11, wherein the exit comprises a cylindrical channel, the wheel is spherical, and the wheel is located at least partially in the cylindrical channel.

13. The drone of claim 11, further comprising a second motor coupled to a cover by a second shaft having a second axis of rotation, wherein the cover is configured to move between a first position where the cover blocks the orifice and a second position where the cover does not block at least a portion of the orifice, wherein the program instructions are configured to at least partially open the orifice by actuating the second motor to rotate the second shaft to enable the portion of the powder to mark the first location.

14. The drone of claim 13, wherein first motor and the second motor are coupled to the container, the second axis is perpendicular to the first axis, and the inside area comprises a funnel that directs the powder toward the exit.

15. A drone configured to help an avalanche victim, the drone comprising: at least one propeller configured to enable the drone to fly, a camera system, and an electronic device detection system, a camera system, at least one marker configured to be dropped by the drone, and program instructions, wherein the program instructions are configured to determine an estimated location of the avalanche victim by taking at least one picture, by the camera system, of an avalanche victim search area, detecting, by the electronic device detection system, an electronic device within a portion of the avalanche victim search area, and determining that the at least one picture does not show a person within the portion of the avalanche victim search area, wherein the program instructions are configured to drop the at least one marker to mark the estimated location in response to the program instructions determining the estimated location of the avalanche victim.

16. The drone of claim 15, further comprising a lidar system, wherein the program instructions are configured to identify the avalanche victim search area by analyzing, using the lidar system, a surface roughness of a snow ground layer and determining that the surface roughness is at least one of indicative of an avalanche and greater than a predetermined threshold.

17. The drone of claim 15, further comprising a radar system, wherein the program instructions are configured to identify the avalanche victim search area by analyzing, using the radar system, a surface roughness of a snow ground layer and determining that the surface roughness is at least one of indicative of an avalanche and greater than a predetermined threshold.

* * * * *